US012614532B2

(12) United States Patent
Chien

(10) Patent No.: US 12,614,532 B2
(45) Date of Patent: Apr. 28, 2026

(54) DISPLAY APPARATUS AND ITS DISPLAY DRIVING CHIP AND METHOD

(71) Applicant: Novatek Microelectronics Corp., Hsinchu (TW)

(72) Inventor: Tso-Hua Chien, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/813,010

(22) Filed: Aug. 22, 2024

(65) Prior Publication Data

US 2024/0412706 A1 Dec. 12, 2024

Related U.S. Application Data

(63) Continuation-in-part of application No. 18/357,166, filed on Jul. 24, 2023, now Pat. No. 12,254,812.

(60) Provisional application No. 63/573,501, filed on Apr. 3, 2024, provisional application No. 63/460,596, filed on Apr. 19, 2023.

(51) Int. Cl.
*G09G 3/36* (2006.01)

(52) U.S. Cl.
CPC ......... *G09G 3/3674* (2013.01); *G09G 3/3614* (2013.01); *G09G 2310/0286* (2013.01); *G09G 2310/04* (2013.01); *G09G 2330/021* (2013.01); *G09G 2340/0435* (2013.01)

(58) Field of Classification Search
CPC ............... G09G 3/3674; G09G 3/3614; G09G 2310/0286; G09G 2310/04; G09G 2330/021; G09G 2340/0435; G09G 2310/0267; G09G 3/3677; G09G 3/2092
See application file for complete search history.

(56) References Cited

U.S. PATENT DOCUMENTS

| | | | | |
|---|---|---|---|---|
| 9,325,311 | B1 * | 4/2016 | Konoshita | G09G 3/3677 |
| 9,466,252 | B2 * | 10/2016 | Yamashita | G09G 3/3648 |
| 10,847,074 | B2 * | 11/2020 | Lee | G09G 3/3677 |

(Continued)

FOREIGN PATENT DOCUMENTS

| | | |
|---|---|---|
| CN | 116153226 | 5/2023 |
| TW | 202236250 | 9/2022 |
| TW | 202316662 | 4/2023 |

OTHER PUBLICATIONS

"Office Action of Taiwan Counterpart Application", issued on Mar. 26, 2025, p. 1-p. 12.

*Primary Examiner* — Jose R Soto Lopez
(74) *Attorney, Agent, or Firm* — JCIPRNET

(57) ABSTRACT

Disclosed are a display apparatus and its display driving chip and method. A display area of the display panel includes a high refresh rate display area and a low refresh rate display area that are adjacent to each other. In a full refresh frame period, both the high refresh rate display area and the low refresh rate display area are refreshed with data. In a partial refresh frame period, data is refreshed in the high refresh rate display area and data is not refreshed in the low refresh rate display area. The controller controls the gate driver such that a boundary between the high refresh rate display area and the low refresh rate display area in a first partial refresh frame period is different from a boundary between the high refresh rate display area and the low refresh rate display area in a second partial refresh frame period.

31 Claims, 16 Drawing Sheets

(56) References Cited

U.S. PATENT DOCUMENTS

| | | | | |
|---|---|---|---|---|
| 11,341,933 | B2 * | 5/2022 | Shin | G09G 3/035 |
| 11,373,578 | B2 * | 6/2022 | Ka | G09G 3/2092 |
| 11,862,065 | B2 | 1/2024 | Li et al. | |
| 12,046,206 | B2 | 7/2024 | Noh et al. | |
| 2009/0213058 | A1 | 8/2009 | Tajiri | |
| 2012/0062547 | A1 * | 3/2012 | Yamada | G09G 3/344 345/214 |
| 2012/0280952 | A1 * | 11/2012 | Hsu | G09G 3/344 345/204 |
| 2013/0293529 | A1 * | 11/2013 | You | G09G 3/20 345/212 |
| 2014/0049533 | A1 * | 2/2014 | Saitoh | G09G 3/20 345/213 |
| 2016/0042707 | A1 * | 2/2016 | Wang | G09G 3/3266 345/214 |
| 2016/0275916 | A1 * | 9/2016 | Glen | G09G 5/395 |
| 2018/0197455 | A1 * | 7/2018 | Han | G09G 3/2085 |
| 2021/0035488 | A1 * | 2/2021 | Seo | G09G 3/325 |
| 2022/0013074 | A1 * | 1/2022 | Hayashi | G02F 1/13439 |
| 2022/0293028 | A1 | 9/2022 | Li et al. | |
| 2023/0094230 | A1 | 3/2023 | Noh et al. | |
| 2023/0098040 | A1 * | 3/2023 | Zhou | G09G 3/3233 345/55 |
| 2025/0078741 | A1 * | 3/2025 | Li | G09G 3/3225 |

* cited by examiner

DISPLAY APPARATUS AND ITS DISPLAY DRIVING CHIP AND METHOD

CROSS-REFERENCE TO RELATED APPLICATION

This application is a continuation-in-part application of and claims the priority benefit of a prior application Ser. No. 18/357,166, filed on Jul. 24, 2023, which claims the priority benefit of U.S. provisional application Ser. No. 63/460,596, filed on Apr. 19, 2023. This application also claims the priority benefit of a U.S. provisional application Ser. No. 63/573,501, filed on Apr. 3, 2024. The entirety of each of the above-mentioned patent applications is hereby incorporated by reference herein and made a part of this specification.

BACKGROUND

Technical Field

The present disclosure relates to an electronic apparatus, and in particular to a display apparatus and its display driving chip and display driving method.

Description of Related Art

In technologies of conventional display panels, all display panels display one or more images at the same frame rate. In some applications, for example, in applications of mobile phones, the entire display panel may be divided into multiple partitions, but different partitions display images at the same frame rate. In many application circumstances, generally there is only one partition for which the screen needs to be refreshed frequently (for example, playing animation), while the other partition has a static screen which does not need to be refreshed frequently. When the entire display area (all partitions) of a conventional display panel is operated at a high frame rate, the display panel consumes more power. Under the circumstances, for partitions where the screens do not need to be refreshed frequently, high frame rate causes a waste of power. When the entire display area (all partitions) of a conventional display panel is operated at a low frame rate, although the power consumption of the display panel is low, the refresh rate (frame rate) is too low for partitions that require frequent screen refreshes.

SUMMARY

The present disclosure provides a display apparatus and its display driving chip and display driving method, so that different display areas (partitions) in the same display panel have different frame rates (refresh rates) adaptively.

In an embodiment of the present disclosure, the display driving chip includes a controller. The controller is configured to control the gate driver of the display panel to be driven by the display driving chip. The gate driver is configured to drive multiple scan lines of the display panel, wherein the display area of the display panel includes the high refresh rate display area and the low refresh rate display area that are adjacent to each other. The display panel displays data in multiple frame periods, wherein the multiple frame periods include at least one full refresh frame period and at least one partial refresh frame period. In a full refresh frame period, both the high refresh rate display area and the low refresh rate display area are refreshed with data. In a partial refresh frame period, data is refreshed in the high refresh rate display area and data is not refreshed in the low refresh rate display area. The controller controls the gate driver so that in multiple frame periods, a boundary between the high refresh rate display area and the low refresh rate display area in the first partial refresh frame period is different from a boundary between the high refresh rate display area and the low refresh rate display area in the second partial refresh frame period.

In an embodiment of the present disclosure, the display driving method includes: controlling the display panel and gate driver by the display driving chip so that the display panel displays data in multiple frame periods, wherein the display area of the display panel includes the high refresh rate display area and the low refresh rate display area that are adjacent to each other, and the multiple frame periods include at least one full refresh frame period and at least one partial refresh frame period; controlling the gate driver by the controller of the display driving chip, so that both the high refresh rate display area and the low refresh rate display area are refreshed with data in the full refresh frame period, and data is refreshed in the high refresh rate display area and data is not refreshed in the low refresh rate display area in the partial refresh frame period; and controlling the gate driver by the controller so that in multiple frame periods, a boundary between the high refresh rate display area and the low refresh rate display area in the first partial refresh frame period is different from a boundary between the high refresh rate display area and the low refresh rate display area in the second partial refresh frame period.

In an embodiment of the present disclosure, the display apparatus includes a display panel, a gate driver and a display driving chip. The display area of the display panel includes the high refresh rate display area and the low refresh rate display area that are adjacent to each other. The display panel displays data in multiple frame periods. The multiple frame periods include at least one full refresh frame period and at least one partial refresh frame period. The gate driver is coupled to and drives multiple scan lines of the liquid crystal display panel. The display driving chip is coupled to the gate driver. The display driving chip controls the gate driver, so that both the high refresh rate display area and the low refresh rate display area are refreshed with data in the full refresh frame period, and data is refreshed in the high refresh rate display area and data is not refreshed in the low refresh rate display area in the partial refresh frame period. The display driving chip controls the gate driver so that in multiple frame periods, the boundary between the high refresh rate display area and the low refresh rate display area in the first partial refresh frame period is different from the boundary between the high refresh rate display area and the low refresh rate display area in the second partial refresh frame period.

Based on the above, the display driving chip according to the embodiments of the present disclosure is able to refresh data in both the high refresh rate display area and the low refresh rate display area in the full refresh frame period. In the partial refresh frame period, data is refreshed in the high refresh rate display area and data is not refreshed in the low refresh rate display area. Therefore, the low refresh rate display area of the display area of the display panel is not refreshed in each partial refresh frame period, so that the refresh rate of the low refresh rate display area of the display panel may be different from that of the high refresh rate display area of the display panel. By controlling the gate driver through the display driving chip, the display apparatus is able to allow different display partitions in the same display panel to have different refresh rates adaptively. In addition, the display driving chip may dynamically change the boundary position between the high refresh rate display area and the low refresh rate display area that are adjacent to each other to blur the visual effect differences at partition boundaries, thereby improving visual effects. By dynamically changing the boundary position between partitions, the display driving chip may further reduce the aging difference of the display panel on both sides of the boundary position between partitions.

In order to make the above-mentioned features and advantages of the present disclosure more obvious and easy to understand, embodiments are given below and described in detail with reference to the attached drawings.

DESCRIPTION OF THE EMBODIMENTS

Figure 1:
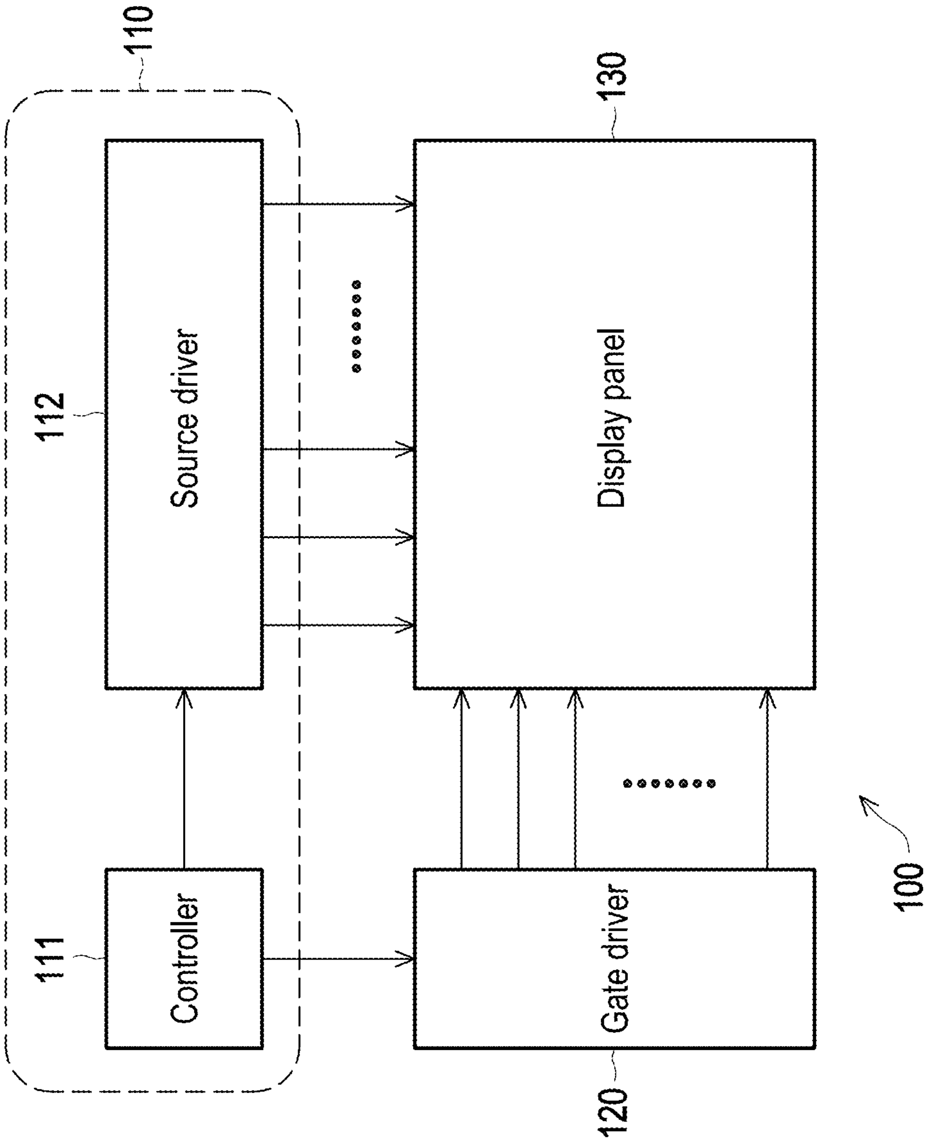
FIG. 1 is a schematic circuit block diagram of a display apparatus according to an embodiment of the present disclosure.

The term "coupled to" (or connected to) used in the entire text of the specification of the present application (including claims) may refer to any direct or indirect connecting means. For example, if the text describes a first device is coupled to (or connected to) a second device, it should be understood that the first device may be directly connected to the second device, or the first device may be indirectly connected to the second device via other devices or certain connecting means. The terms "first", "second", and the like as mentioned throughout the present specification (including the claims) are used to name the elements or to distinguish between different embodiments or scopes, rather than setting an upper or lower limit on the number of the elements or the order of the elements. In addition, wherever possible, elements/components/steps with the same reference numerals in the drawings and embodiments represent the same or similar parts. Cross-reference may be made between the elements/components/steps in different embodiments that are denoted by the same reference numerals or that have the same names.

FIG. 1 is a schematic circuit block diagram of a display apparatus 100 according to an embodiment of the present disclosure. The display apparatus 100 shown in FIG. 1 includes a display driving chip 110, a gate driver 120 and a display panel 130. Based on the actual design, the display panel 130 may include various types of display panels, such as a liquid crystal display (LCD) panel or other display panels. The display driving chip 110 is coupled to multiple data lines (or referred to as source lines) of the display panel 130 to drive the multiple data lines of the display panel 130. The display driving chip 110 is coupled to the gate driver 120. The gate driver 120 is coupled to multiple scan lines (or referred to as gate lines) of the display panel 130. The gate driver 120 may scan multiple scan lines of the display panel 130 to display data on horizontal display lines (i.e., pixel rows) row by row. According to the actual design, the gate driver 120 may include a gate driver on array (GOA) or other gate driving circuits. In conjunction with the scan timing of the gate driver 120 on the display panel 130, the display driving chip 110 may drive multiple data lines of the display panel 130, so that the display panel 130 displays corresponding data (image) in each frame period.

The display panel 130 is a display panel that may realize different refresh rates in partitions. The display area of the display panel includes at least two partitions with different refresh rates, such as a first display partition and a second display partition adjacent to each other. The one with a relatively high refresh rate (for example, 120 Hz) among the two display partitions is a high refresh rate display area, while the one with a relatively low refresh rate (for example, 60 Hz) among the two display partitions is a low refresh rate display area. For example, taking the screen of a mobile phone as an example of the display apparatus 100 and the display panel 130, when the mobile phone opens a streaming multimedia application, the upper area of the screen is the video playing area (which is a high refresh rate display area) and the lower area of the screen is a message area (which is a low refresh rate display area). The display apparatus 100 may reduce the refresh rate of the low refresh rate display area to reduce power consumption while maintaining a high refresh rate in the high refresh rate display area.

The multiple frame periods in which the display panel 130 displays image screens include two types of frame periods, one is a full refresh frame period, and the other is a partial refresh frame period. In the full refresh frame period, both the high refresh rate display area and the low refresh rate display area are refreshed with data. In the partial refresh frame period, data is only refreshed in the high refresh rate display area, while data is not refreshed in the low refresh rate display area. The full refresh frame period and the partial refresh frame period are configured at intervals in time. For example, assuming the input frame rate is 120 Hz and a full refresh frame period and a subsequent partial refresh frame period are altogether regarded as a full-partial refresh period for repeated configuration, then the refresh rate of the high refresh rate display area is 120 Hz and the refresh rate of the low refresh rate display area is 60 Hz. In another example, assuming that the input frame rate is 120 Hz and a full refresh frame period and two consecutive partial refresh frame periods are altogether regarded as a full-partial refresh period for repeated configuration, then the refresh rate of the high refresh rate display area is 120 Hz and the refresh rate of the low refresh rate display area is 40 Hz (because data of the low refresh rate display area is refreshed in one frame period of every three frame periods).

For the display panel 130, when the boundary position between two display partitions with different refresh rates remains unchanged for a long time, the boundary will be clearly visible after long-term use if the refresh rate difference between the two areas is large. Furthermore, the panel aging phenomenon in the high refresh rate display area is more serious than that in the low refresh rate display area, making it easier for the viewer to see the boundary between the two display partitions (because the refresh rate difference causes the aging speed of the two areas to be different), which is unfavourable in terms of visual effect. In the embodiment of the present disclosure, the display driving chip 110 dynamically changes the boundary position between the display partitions with different refresh rates, so that the boundary between the two display partitions dynamically change positions within a limited range, thereby blurring the visual effect difference of the boundary between display areas.

For example (but not limited thereto), assume that the display panel 130 shown in FIG. 1 includes 1612 scan lines. Based on the actual operation circumstances, the display driving chip 110 may take the first display partition controlled by multiple scan lines (such as the 1st to 540th scan lines) on the upper part of the display panel 130 as a high refresh rate display area and take the second display partition controlled by the multiple scan lines (for example, the 541th to 1612th scan lines) on the lower part of the display panel 130 as a low refresh rate display area. In a full refresh frame period, the display driving chip 110 controls the gate driver 120 and the display panel 130 to refresh data in both the high refresh rate display area (such as the 1st to 540th horizontal display lines) and the low refresh rate display area (such as the 541th to the 1612th horizontal display lines). In a first partial refresh frame period, the display driving chip 110 controls the gate driver 120 and the display panel 130 to refresh data only in the high refresh rate display area (for example, the 1st to 540th horizontal display lines), and not to refresh data in the low refresh rate display area (for example, the 541th to 1612th horizontal display lines). In a second partial refresh frame period, the display driving chip 110 controls the gate driver 120 to change the boundary position between the high refresh rate display area and the low refresh rate display area, for example, from the original boundary between the 540th horizontal display line and the 541th horizontal display line to a new boundary between the 541th horizontal display line and the 542th horizontal display line (or to a new boundary between the 539th horizontal display line and the 540th horizontal display line). In the second partial refresh frame period, data is only refreshed in the high refresh rate display area (such as the 1st to 541th horizontal display lines) while data is not refreshed in the low refresh rate display area (such as the 542th to 1612th horizontal display lines).

At the beginning of each frame period (or at the end of each frame period), the display driving chip 110 sends a reset pulse (original reset pulse) to the gate driver 120 to clear the scan pulses of the gate driver 120 before scanning the display panel 130 no matter the frame period is a full refresh frame period or a partial refresh frame period, to clear the scan pulses latched in the gate driver 120 in order to prepare to start displaying the next frame. After the original reset pulse occurs, the gate driver 120 may start to transmit scan pulses in sequence based on the vertical start pulse STV provided by the display driving chip 110 and output the scan signals to the scan lines that scan the display panel 130. If the current frame period is the full refresh frame period, the display driving chip 110 only sends a single reset pulse to the gate driver 120 at the beginning or end of the current frame period (such as the first time point t1 in the drawing of the embodiment to be described later), such that the shift register circuit in the gate driver 120 starts transmitting scan pulses in sequence. Accordingly, the gate driver 120 may sequentially output scan signals to all scan lines of the display panel 130, including scan lines corresponding to the high refresh rate display area and scan lines corresponding to the low refresh rate display area.

On the other hand, if the current frame period is a partial refresh frame period, in addition to sending an original reset pulse to the gate driver 120 at the beginning or end of the current frame period (such as the first time point t1 in the drawing of the embodiment to be described later) to the shift register circuit in the gate driver 120 to start transmitting scan pulses in sequence, the display driving chip 110 further sends an additional reset pulse (i.e., the second reset pulse in the frame period) to the gate driver 120 after the previously displayed high refresh rate display area finishes displaying (such as the second time point t2 in the drawing of the embodiment described later), that is, after the gate driver 120 outputs the scan pulse corresponding to the last (latest in time) scan line of the high refresh rate display area. The additional reset pulse clears the scan pulses latched in the gate driver 120. That is to say, after the high refresh rate display area finishes displaying, since data is not required to be refreshed in the low refresh rate display area during the partial refresh frame period, the gate driver 120 does not need to output scan signals to the scan lines corresponding to the low refresh rate display area.

In the embodiment shown in FIG. 1, the display driving chip 110 includes a controller 111 and a source driver 112. The source driver 112 is coupled to multiple data lines of the display panel 130. The controller 111 is coupled to the source driver 112 and the gate driver 120. The controller 111 controls the gate driver 120 of the display panel 130. The gate driver 120 is configured to drive multiple scan lines of the display panel 130. Depending on different designs, in some embodiments, the controller 111 may be implemented as a hardware circuit. In other embodiments, the controller 111 may be implemented in the form of firmware, software (i.e., program), or a combination of the foregoing. In some embodiments, the implementation of the controller 111 may be a combination of hardware, firmware, and software.

In terms of hardware, the above display driving chip 110 and/or the controller 111 may be implemented in a logic circuit on an integrated circuit. For example, the related functions of the display driving chip 110 and/or the controller 111 may be implemented in one or more controllers, microcontrollers, microprocessors, application-specific integrated circuit (ASIC), digital signal processor (DSP), field programmable gate array (FPGA), central processing unit (CPU) and/or other various logic blocks, modules and circuits in the processing unit. The related functions of the display driving chip 110 and/or the controller 111 may be implemented as hardware circuits using hardware description languages (such as Verilog HDL or VHDL) or other suitable programming languages, such as various logic blocks, modules and circuits in the integrated circuit.

In terms of software and/or firmware, the related functions of the above-mentioned display driving chip 110 and/or the controller 111 may be implemented as programming codes. For example, the display driving chip 110 and/or the controller 111 are implemented using general programming languages (such as C, C++ or combination language) or other suitable programming languages. The programming code may be recorded/stored in a "non-transitory machine-readable storage medium". In some embodiments, the non-transitory machine-readable storage medium includes, for example, a semiconductor memory and/or a storage device. The semiconductor memory includes a memory card, a read only memory (ROM), a flash memory, a programmable logic circuit or other semiconductor memory. The storage device includes a tape, a disk, a hard disk drive (HDD), a solid-state drive (SSD), or other storage devices. The electronic apparatus (such as a computer, CPU, controller, microcontroller or microprocessor) may read and execute the programming code from the non-transitory machine-readable storage medium, thereby realizing related functions of the display driving chip 110 and/or the controller 111.

Figure 2:
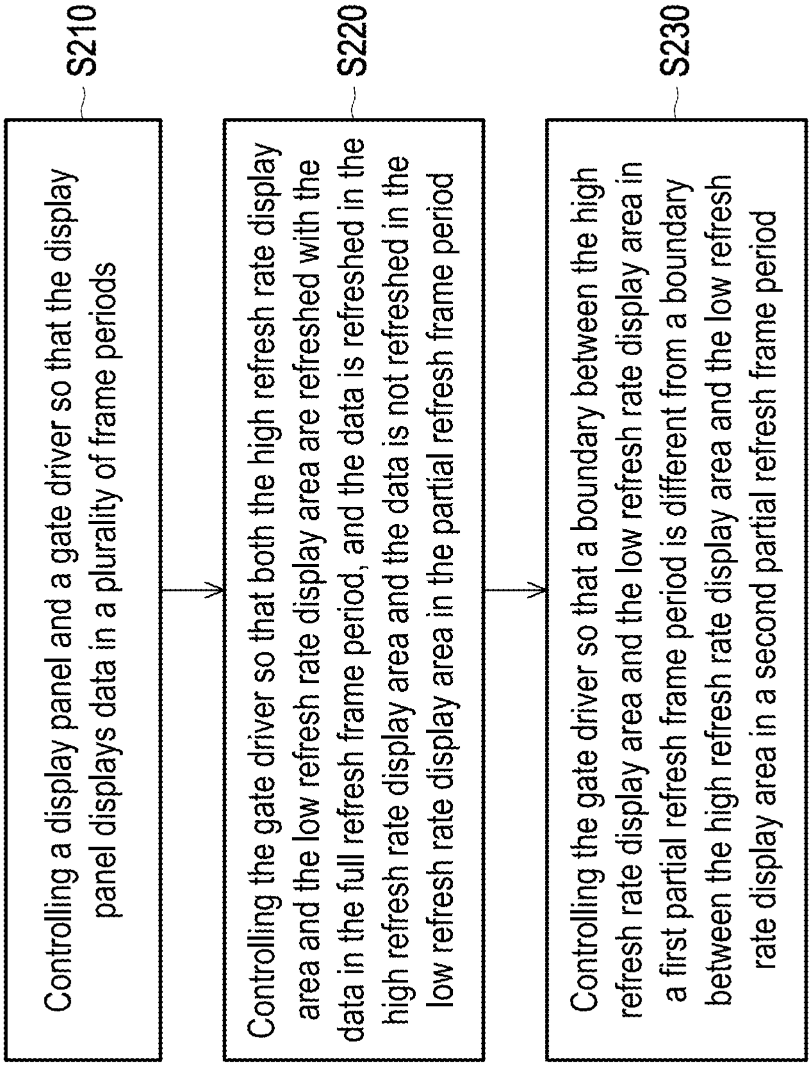
FIG. 2 is a schematic flow chart of a display driving method according to an embodiment of the present disclosure.

FIG. 2 is a schematic flow chart of a display driving method according to an embodiment of the present disclosure. In the embodiment of FIG. 2, the full-partial refresh period includes one full refresh frame period and two partial refresh frame periods as an example, but the configuration of the full-partial refresh period is not limited thereto. Referring to FIG. 1 and FIG. 2, the display driving chip 110 controls the display panel 130 and the gate driver 120 so that the display panel 130 displays data in multiple frame periods (step S210). In step S220, the controller 111 controls the gate driver 120 to refresh data in both the high refresh rate display area and the low refresh rate display area in the full refresh frame period, and to refresh data in the high refresh rate display area and not to refresh data in the low refresh rate display area in the partial refresh frame period. Specifically, the controller 111 sends an original reset pulse to the gate driver 120 at the beginning (such as the first time point t1 in the drawing of the embodiment to be described later) or the end of the full refresh frame period, such that the shift registers in the gate driver 120 begin to transmit scan pulses in sequence. Accordingly, the gate driver 120 may sequentially output scan signals to all scan lines of the display panel 130, including the scan lines corresponding to the high refresh rate display area and the scan lines corresponding to the low refresh rate display area.

The full refresh frame period is followed by the first partial refresh frame period. The controller 111 sends an original reset pulse to the gate driver 120 at the beginning (such as the first time point t1 in the drawing of the embodiment to be described later) or the end of the first partial refresh frame period, such that the shift register circuit in the gate driver 120 begins to transmit scan pulses in sequence. Additionally, the controller 111 further sends an additional reset pulse (i.e., the second reset pulse in the first partial refresh frame period) to the gate driver 120 after the previously displayed high refresh rate display area finishes displaying (such as the second time point t2 in the drawing of the embodiment described later), that is, after the gate driver 120 outputs the scan pulse corresponding to the last (latest in time) scan line of the high refresh rate display area, so as to clear the scan pulses latched in the gate driver 120. After the high refresh rate display area finishes displaying, since data is not required to be refreshed in the low refresh rate display area during the first partial refresh frame period, the gate driver 120 does not need to output scan signals to the scan lines corresponding to the low refresh rate display area.

The first partial refresh frame period is followed by the second partial refresh frame period. The controller 111 sends an original reset pulse to the gate driver 120 at the beginning (such as the first time point t1 in the drawing of the embodiment to be described later) or the end of the second partial refresh frame period, such that the shift register circuit in the gate driver 120 begins to transmit scan pulses in sequence. It is worth noting that, in step S230, the controller 111 controls the gate driver 120, so that in multiple frame periods, the boundary between the high refresh rate display area and the low refresh rate display area in the first partial refresh frame period is different from the boundary between the high refresh rate display area and the low refresh rate display area in the second partial refresh frame period. In detail, the number of horizontal display lines corresponding to the high refresh rate display area in the second partial refresh frame period is different from the number of horizontal display lines corresponding to the high refresh rate display area in the first partial refresh frame period. For example (but not limited thereto), the high refresh rate display area in the first partial refresh frame period includes the 1st to 540th horizontal display lines of the display panel, and the high refresh rate display area in the second partial refresh frame period includes the 1st to 541th horizontal display lines of the display panel, that is to say, the boundary between the high refresh rate display area and the low refresh rate display area has changed. The controller 111 sends an additional reset pulse (i.e., the second reset pulse in the second partial refresh frame period) to the gate driver 120 after the previously displayed high refresh rate display area finishes displaying (such as the third time point t3 in the drawing of the embodiment described later), that is, after the gate driver 120 outputs the scan pulse corresponding to the last (latest in time) scan line of the high refresh rate display area, so as to clear the scan pulses latched in the gate driver 120. The third time point t3 and the second time point t2 correspond to different boundaries between the high refresh rate display area and the low refresh rate display area. After the high refresh rate display area finishes displaying, since data is not required to be refreshed in the low refresh rate display area during the second partial refresh frame period, the gate driver 120 does not need to output scan signals to the scan lines corresponding to the low refresh rate display area.

In summary, the controller 111 of the display driving chip 110 in this embodiment may send a single reset pulse (original reset pulse) to the gate driver 120 in each full refresh frame period of the display frame stream to refresh all display areas (all display partitions) of the display panel 130. In each partial refresh frame period of the display frame stream, the controller 111 may send multiple reset pulses (such as an original reset pulse and an additional reset pulse) to the gate driver 120, and the gate driver 120 may sequentially output scan signals based on the vertical start pulse provided by the display driving chip 110 to scan the scan lines of the display panel 130. Therefore, the high refresh rate display area of the display panel 130 may be refreshed in each partial refresh frame period, and after the controller 111 sends an additional reset pulse, the scan pulses in the gate driver 120 have been cleared, so that the gate driver 120 does not scan the scan lines in the low refresh rate display area of the display panel 130. Even if the number or range of horizontal display lines in the low refresh rate display area and the corresponding number or range of scan lines are changed in different partial refresh frame periods, all are controlled by additional reset pulses so that there is no need to refresh data in the low refresh rate display area. Based on the control of the gate driver 120 by the controller 111 of the display driving chip 110, different display partitions in the display panel 130 may adaptively have different refresh rates.

Figure 3:
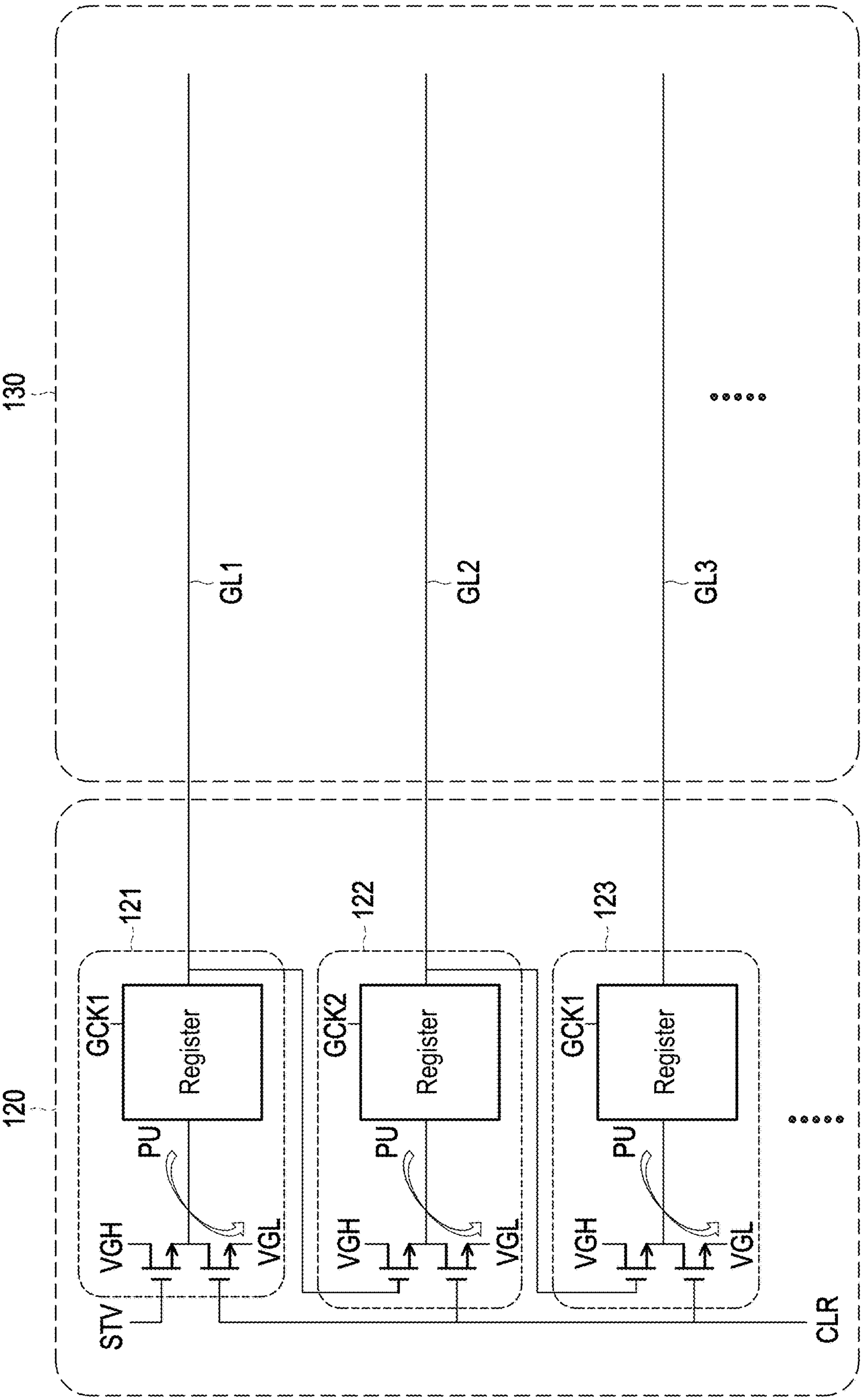
FIG. 3 is a schematic circuit block diagram of a gate driver according to an embodiment of the present disclosure.

FIG. 3 is a circuit block diagram of the gate driver 120 according to an embodiment of the present disclosure. In the embodiment shown in FIG. 3, the gate driver 120 includes multiple shift registers, such as the shift registers 121, 122 and 123 shown in FIG. 3. Each one of shift registers 121, 122 and 123 is coupled to a corresponding scan line of the display panel 130, such as the scan lines GL1, GL2 and GL3 shown in FIG. 3. As shown in FIG. 3, the shift registers 121 to 123 are triggered by the vertical start pulse STV and gate clock signals GCK1 and GCK2 to transmit scan pulses in sequence. The voltages VGH and VGL shown in FIG. 3 are the power supply voltage and the reference voltage (high voltage and low voltage) respectively. In addition to sending a reset pulse CLR (original reset pulse) to each shift register of the gate driver 120 at the start point (or end point) of each partial refresh frame period, the display driving chip 110 further sends another reset pulse CLR (additional reset pulse) to each shift register at other time points in each partial refresh frame period. Based on the additional reset pulse CLR, the latched contents of the entire series of shift registers 121 to 123 will be pulled down to the reference voltage VGL (that is, the scan pulses latched in the gate driver 120 are cleared), causing the entire series of shift registers 121 to 123 unable to transmit scan pulses continuously.

According to the actual design, the display driving chip 110 may send an additional reset pulse CLR to each shift register 121 to 123 in each partial refresh frame period, and/or stop supplying the gate clock signal GCK (such as GCK1 and GCK2 shown in FIG. 3) during part of each partial refresh frame period. By stopping the toggling behavior on the gate clock signal GCK (such as GCK1 and GCK2 shown in FIG. 3), and/or by applying multiple reset pulses CLR in the same partial refresh frame period, the gate driver 120 is controlled to stop the scan operation on the display panel 130 after the high refresh rate display area of the display panel 130 completes refreshing.

In the present disclosure, the boundary between the high refresh rate display area and the low refresh rate display area may be dynamically changed, thereby blurring the visual effect difference between the display area boundaries. For example, by stopping the toggling behavior on the gate clock signal GCK in the low refresh rate display area, the voltage (latched content) of the node PU of each one of the shift registers 121 to 123 is pulled down to be close to the reference voltage VGL (that is, the scan pulses latched in the gate driver 120 are cleared) due to leakage, such that the scan pulse shifting operation (scan operation) on the shift registers 121 to 123 of the gate driver 120 is stopped. Based on stopping supplying the gate clock signals GCK1 and GCK2 to the gate driver 120, the low refresh rate display area of the display panel 130 is not refreshed in each partial refresh frame period, so that the refresh rate of the low refresh rate display area of the display panel 130 may be different from the high refresh rate display area of the display panel 130. Therefore, the display apparatus 100 may allow different display partitions in the same display panel 130 to have different refresh rates adaptively.

Alternatively, the display driving chip 110 may use an additional reset pulse CLR in the low refresh rate display area, so that the voltage (latched content) of the node PU of each one of the shift registers 121 to 123 may be quickly pulled down to be close to the reference voltage VGL (that is, the scan pulses latched in the gate driver 120 are cleared), thereby stopping the scan pulse shifting operation (scan operation) of the gate driver 120. Based on applying the additional reset pulse CLR, the low refresh rate display area of the display panel 130 is not refreshed in each partial refresh frame period, so that the refresh rate of the low refresh rate display area of the display panel 130 may be different from the high refresh rate display area of the display panel 130. Therefore, the display apparatus 100 may allow different display partitions in the same display panel 130 to have different refresh rates adaptively.

The source driver 112 of the display driving chip 110 may drive multiple data lines of the display panel 130 based on the control of the controller 111. In some embodiments, in conjunction with the scan timing on the display panel 130 by the gate driver 120, the controller 111 enables the source driver 112 before the second time point in each partial refresh frame period, and the controller 111 disables the analog domain circuit and/or the digital domain circuit of the source driver 112 after the second time point in each partial refresh frame period. For example, the source driver 112 may stop or reduce the source voltage change behavior (such as maintaining DC level, Hi-Z or other methods) for the second partition (low refresh rate display area) to save power consumption.

The controller 111 can dynamically adjust the stop position of the gate clock signal, and/or dynamically determine the timing of additional reset pulses so that the shift register of the gate driver 120 stops the scan pulse shifting operation at a certain target time point. Therefore, during the partial refresh frame period, only the pixel data in the high refresh rate display area of the display panel 130 is refreshed, while the pixel data in the low refresh rate display area of the display panel 130 remains unchanged (not refreshed).

Figure 4:
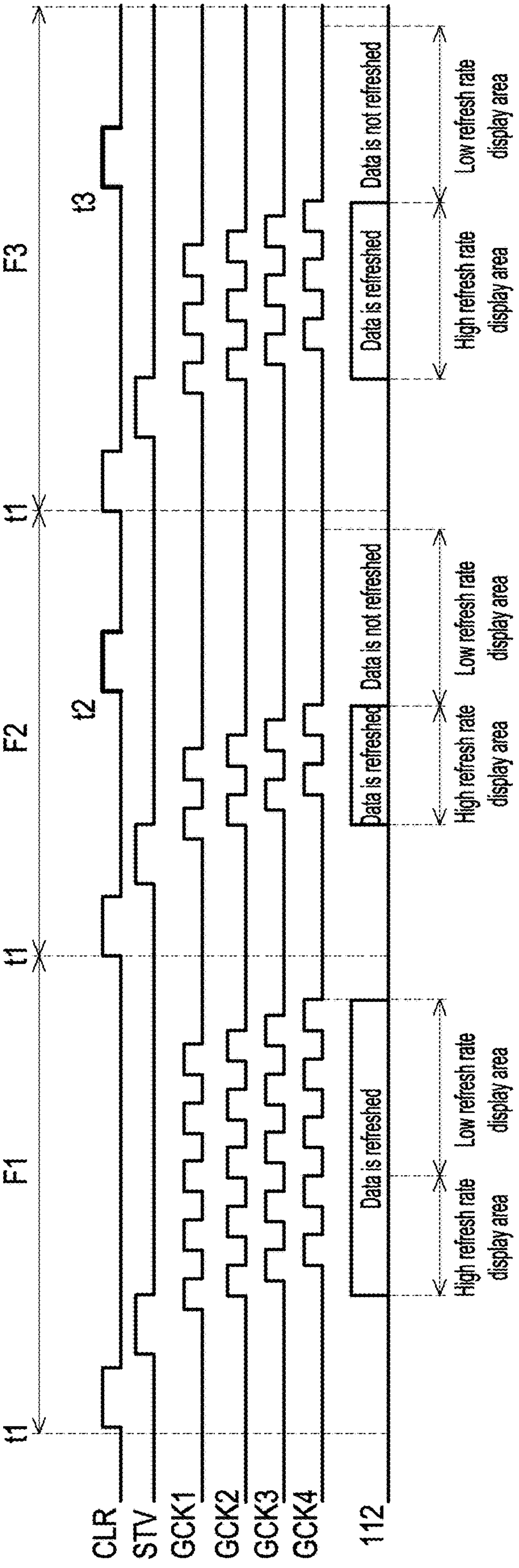
FIG. 4 is a schematic signal timing diagram of a gate driver according to an embodiment of the present disclosure.

FIG. 4 is a schematic signal timing diagram of the gate driver 120 according to an embodiment of the present disclosure. The horizontal axis of FIG. 4 represents time. The vertical start pulse STV and the shift register may not be limited to one set. The gate clock signals GCK1, GCK2, GCK3 and GCK4 shown in FIG. 4 are configured to trigger multiple shift registers of the gate driver 120. The frame period F1 shown in the left part of FIG. 4 is the full refresh frame period (normal display frame). In the frame period F1, the reset pulse CLR first clears the scan pulses of all shift registers of the gate driver 120 at the first time point t1 in the frame period F1, and then the controller 111 may provide the vertical start pulse STV and the gate clock signals GCK1 to GCK4 to the gate driver 120. Based on the vertical start pulse STV and the gate clock signals GCK1 to GCK4, the gate driver 120 and the source driver 112 may completely refresh the high refresh rate display area and the low refresh rate display area. Therefore, in the frame period F1, all display areas of the display panel 130 may be refreshed normally.

The frame period F2 shown in the middle of FIG. 4 is the first partial refresh frame period. In the frame period F2, the gate driver 120 scans the high refresh rate display area and does not scan the low refresh rate display area. The controller 111 sends the original reset pulse CLR to the gate driver 120 at the first time point t1 in the frame period F2 to start generating multiple scan pulses corresponding to the high refresh rate display area. After the data in the high refresh rate display area is refreshed in the first partial refresh frame period, the controller 111 further sends an additional reset pulse CLR to the gate driver 120 at the second time point t2 in the frame period F2 (corresponding time point of the boundary position between the high refresh rate display area and the low refresh rate display area of the display panel 130), so as to clear the charge of the node PU of all the shift registers of the gate driver 120 (i.e., to clear the scan pulses in the gate driver 120). Therefore, the scan pulse transmission of all shift registers of the gate driver 120 is suspended, so that the low refresh rate display area will not be refreshed in the frame period F2. In the frame period F2, the controller 111 continues to supply the gate clock signals GCK1 to GCK4 to the gate driver 120 before the second time point t2.

The source driver 112 drives multiple data lines of the display panel 130 based on the control of the controller 111. The controller 111 enables the source driver 112 before the first time point t1 in the frame period F2. In accordance with the operation timing of the gate driver 120, before the second time point t2, the source driver 112 may refresh data in the high refresh rate display area. After the data in the high refresh rate display area is refreshed, the controller 111 stops the toggling behavior on the gate clock signals GCK1 to GCK4 output to the gate driver 120 from the second time point t2 when the additional reset pulse is transmitted. In accordance with the operation timing of the gate driver 120, after the second time point t2, the source driver 112 may stop refreshing pixel data in the low refresh rate display area. The controller 111 disables the analog domain circuit or the digital domain circuit of the source driver 112 after the second time point t2 in the frame period F2. For example, when the shift registers of the gate driver 120 stop transmitting scan pulses, the source driver 112 may maintain the grayscale voltage presenting black (or other DC levels) to the data lines of the display panel 130, or maintain the hi-Z resistance state to the data lines, or reduce the frequency of changes to the data lines. Alternatively, the digital data path (digital domain circuit) in the source driver 112 may enter a power saving mode.

The frame period F3 shown in the right part of FIG. 4 is the second partial refresh frame period. In the frame period F3, the gate driver 120 scans the high refresh rate display area and does not scan the low refresh rate display area. After the data in the high refresh rate display area is refreshed in the frame period F3, the controller 111 sends an additional reset pulse to the gate driver 120 at the third time point t3 to clear the scan pulses in the gate driver 120. Regarding the frame period F3 and the third time point t3, please refer to the relevant description of the frame period F2 and the second time point t2 by analogy, so no further description is incorporated herein. It is worth noting that in the frame period F3, the controller 111 controls the gate driver 120, so that the boundary between the high refresh rate display area and the low refresh rate display area in the frame period F2 (the first partial refresh frame period) is different from the boundary between the high refresh rate display area and the low refresh rate display area in the frame period F3 (second partial refresh frame period). In detail, the number of horizontal display lines corresponding to the high refresh rate display area in the frame period F3 is different from the number of horizontal display lines corresponding to the high refresh rate display area in the frame period F2. For example (but not limited thereto), the high refresh rate display area in the frame period F2 includes the 1st to 540th horizontal display lines of the display panel, and the high refresh rate display area in the frame period F3 includes the 1st to 541th horizontal display lines of the display panel, which means that the boundary between the high refresh rate display area and the low refresh rate display area has changed. At the third time point t3, that is, after the gate driver 120 outputs the scan signal corresponding to the last (latest in time) scan line of the high refresh rate display area, the controller 111 sends an additional reset pulse to the gate driver 120 to clear the scan pulses latched in the gate driver 120. The position of the third time point t3 in the frame period F2 is different from the position of the second time point t2 in the frame period F2.

Figure 5:
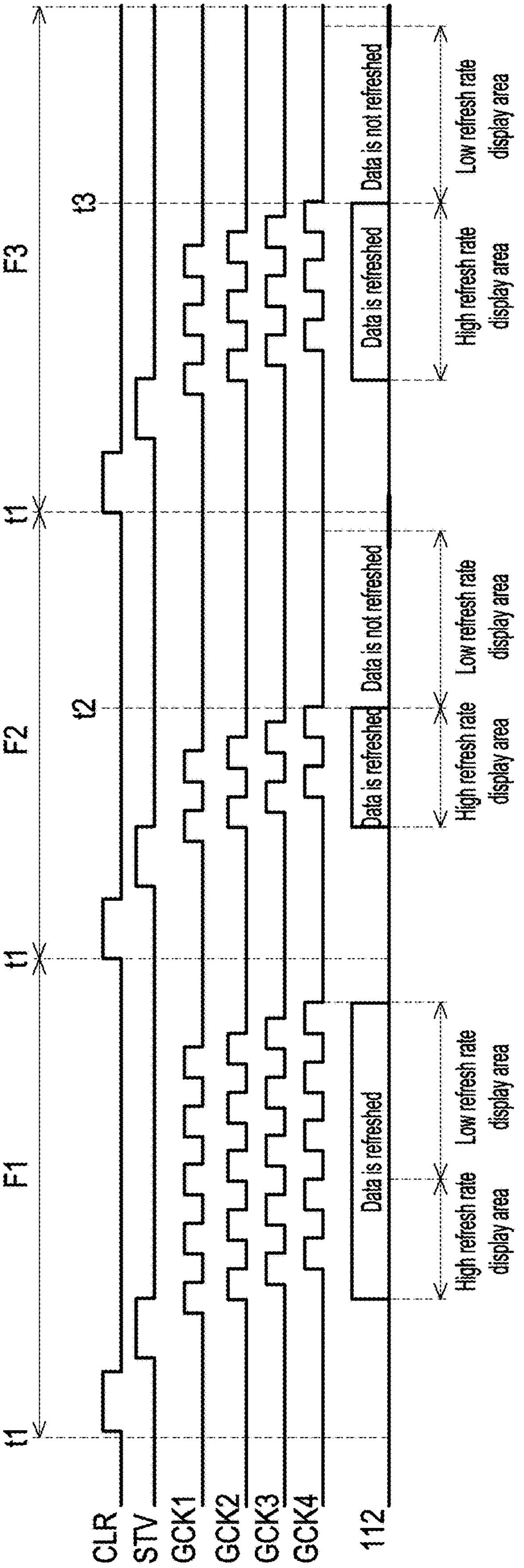
FIG. 5 is a schematic signal timing diagram of a gate driver according to another embodiment of the present disclosure.

FIG. 5 is a schematic signal timing diagram of the gate driver 120 according to another embodiment of the present disclosure. The horizontal axis of FIG. 5 represents time. The frame period F1 shown in the left part of FIG. 5 is the full refresh frame period (normal display frame). In the frame period F1, all display areas of the display panel 130 are refreshed normally. The frame period F2 shown in the middle of FIG. 5 is the partial refresh frame period. In the frame period F2, based on the control of the controller 111, the gate driver 120 only scans the high refresh rate display area of the display panel 130. After the gate driver 120 refreshes the high refresh rate display area, the controller 111 may stop the toggling behavior on the gate clock signals GCK1 to GCK4, that is, the controller 111 stops supplying the gate clock signals GCK1 to GCK4 to the gate driver 120 after the second time point t2, such that all shift registers of the gate driver 120 stop scan pulse shifting operation. During the period when the shift registers stop scan pulse shifting operation, the voltage of the node PU of the shift registers drops due to leakage (the scan pulses latched in the gate driver 120 are cleared). When the reset pulse CLR of the next frame period comes, the scan pulses of all shift registers of the gate driver 120 will be cleared (voltage of node PU is reset). When the vertical start pulse STV of the next frame period comes, the source driver 112 and the gate driver 120 may refresh the screen from the beginning. When the shift registers of the gate driver 120 stop scan pulse shifting operation, the source driver 112 may maintain the grayscale voltage presenting black (or other DC levels) to the data lines of the display panel 130, or maintain hi-Z resistance state to the data lines, or reduce the frequency of changes to the data lines. Alternatively, the digital data path (digital domain circuit) in the source driver 112 may enter a power saving mode.

Descriptions of the frame period F1, the frame period F2, and the frame period F3 shown in FIG. 5 may be derived from the descriptions related to the frame period F1, the frame period F2, and the frame period F3 shown in FIG. 4 by analogy, so no further details will be incorporated herein. Different from the embodiment shown in FIG. 4, the controller 111 does not send an additional reset pulse CLR to the gate driver 120 after the second time point t2 and the third time point t3 shown in FIG. 5.

Figure 6:
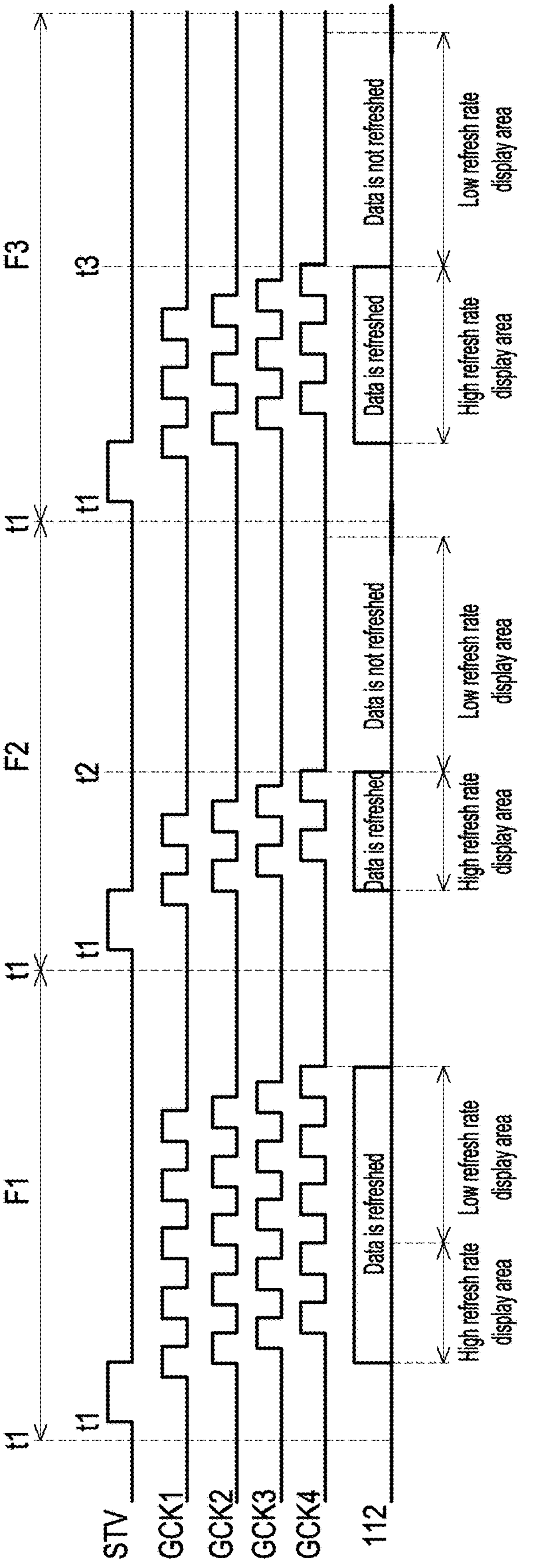
FIG. 6 is a schematic signal timing diagram of a gate driver according to still another embodiment of the present disclosure.

FIG. 6 is a schematic signal timing diagram of a gate driver 120 according to still another embodiment of the present disclosure. The horizontal axis of FIG. 6 represents time. The frame period F1 shown in the left part of FIG. 6 is the full refresh frame period (normal display frame). In the frame period F1, all display areas of the display panel 130 are refreshed normally. The frame period F2 shown in the middle of FIG. 6 is a partial refresh frame period. In the frame period F2, based on the control of the controller 111, the gate driver 120 only scans the high refresh rate display area of the display panel 130. After the gate driver 120 completes refreshing the high refresh rate display area, the controller 111 may stop the toggling behavior on the gate clock signals GCK1 to GCK4, so that all shift registers of the gate driver 120 stop scan pulse shifting operation. During the period when the shift registers stop scan pulse shifting operation, the voltage of the node PU of the shift registers drops due to leakage, thereby causing the scan pulses latched in the gate driver 120 to disappear (i.e., the scan pulses are cleared). When the vertical start pulse STV of the next frame period comes, the source driver 112 and the gate driver 120 can refresh the screen from the beginning. When the shift registers of the gate driver 120 stop scan pulse shift operation, the source driver 112 may maintain the grayscale voltage presenting black (or other DC levels) to the data lines of the display panel 130, or maintain the hi-Z resistance state to the data lines, or reduce the frequency of changes to the data lines. Alternatively, the digital data path (digital domain circuit) in the source driver 112 may enter a power saving mode.

Descriptions of the frame period F1, the frame period F2, and the frame period F3 shown in FIG. 6 may be derived from the descriptions related to the frame period F1, the frame period F2, and the frame period F3 shown in FIG. 4 by analogy, so no further details will be incorporated herein. Different from the embodiment shown in FIG. 4, the controller 111 does not send an additional reset pulse CLR to the gate driver 120 after the second time point t2 and the third time point t3 shown in FIG. 6.

Figure 7:
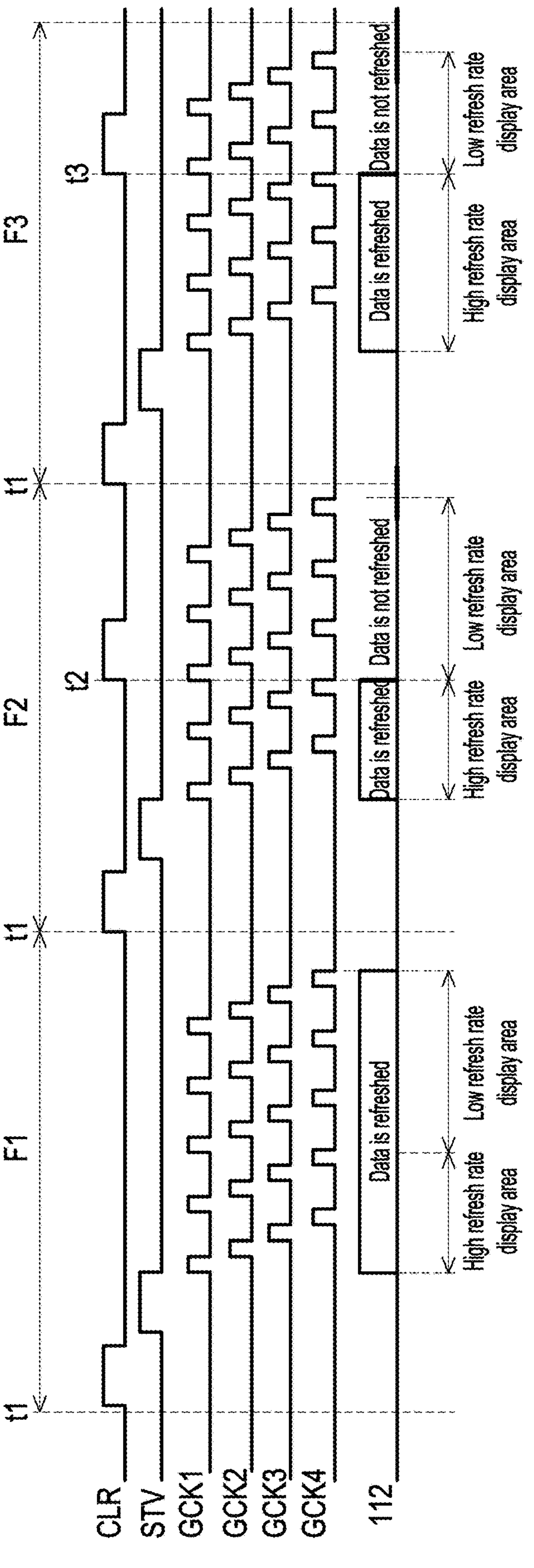
FIG. 7 is a schematic signal timing diagram of a gate driver according to yet another embodiment of the present disclosure.

FIG. 7 is a schematic signal timing diagram of a gate driver 120 according to yet another embodiment of the present disclosure. The horizontal axis of FIG. 7 represents time. The frame period F1 shown in the left part of FIG. 7 is the full refresh frame period (normal display frame). In the frame period F1, all display areas of the display panel 130 are refreshed normally. The frame period F2 shown in the middle of FIG. 7 is a first partial refresh frame period. The frame period F3 shown in the right part of FIG. 7 is the second partial refresh frame period. Descriptions of the frame period F1, the frame period F2, and the frame period F3 shown in FIG. 7 may be derived from the descriptions related to the frame period F1, the frame period F2, and the frame period F3 shown in FIG. 4 by analogy, so no further details will be incorporated herein. Different from the embodiment shown in FIG. 4, after the gate driver 120 refreshes the high refresh rate display area, the controller 111 transmits an additional reset pulse and does not stop the toggling behavior on the gate clock signal GCK. That is, after the second time point t2 of the frame period F2 and after the third time point t3 of the frame period F3, the controller 111 continues to supply the gate clock signals GCK1 to GCK4 to the gate driver 120.

Figure 8:
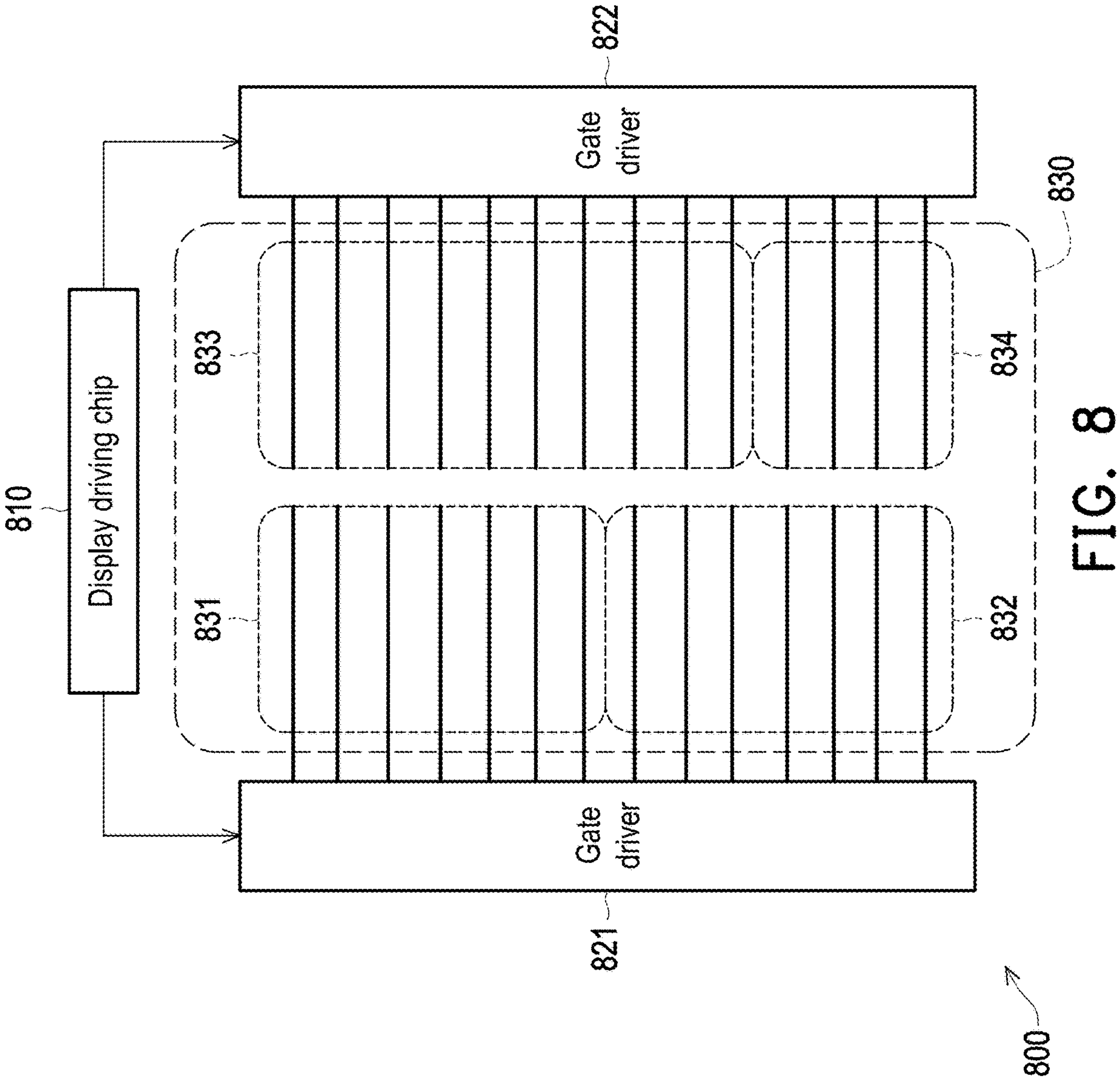
FIG. 8 is a schematic circuit block diagram of a display apparatus according to another embodiment of the present disclosure.

FIG. 8 is a schematic circuit block diagram of a display apparatus 800 according to another embodiment of the present disclosure. The display apparatus 800 shown in FIG. 8 includes a display driving chip 810, a gate driver 821, a gate driver 822 and a display panel 830. Description of the display apparatus 800, the display driving chip 810 and the display panel 830 shown in FIG. 8 may be derived from the description related to the display apparatus 100, the display driving chip 110 and the display panel 130 shown in FIG. 1 by analogy, and description of the gate driver 821 and the gate driver 822 shown in FIG. 8 may be derived from the description related to the gate driver 120 shown in FIG. 1 by analogy.

In the embodiment shown in FIG. 8, the display panel 830 is divided into a left half and a right half, wherein the scan lines in the left half are not electrically connected to the scan lines in the right half. The gate driver 821 is configured on the left side of the display panel 830, and the gate driver 822 is configured on the right side of the display panel 830. The gate driver 821 is coupled to multiple first scan lines of the display panel 830, and the gate driver 822 is coupled to multiple second scan lines of the display panel 830, as shown in FIG. 8. The display driving chip 810 is coupled to the gate drivers 821 and 822. When different gate drivers 821 and 822 are used on the left and right sides of the display panel 830, the gate drivers 821 and 822 may independently perform scan operation on the display panel 830. Description of the scan operation performed by any one of the gate drivers 821 and 822 on the display panel 830 may be derived from the relevant descriptions in FIG. 3 to FIG. 7 by analogy, so the details will not be described again.

The gate driver 821 drives the first scan lines of the display panel 830, and the gate driver 822 drives the second scan lines of the display panel 830. The display driving chip 810 sends a single reset pulse to the gate driver 821 in each full refresh frame period to clear the scan pulses in the gate driver 821. The display driving chip 810 sends multiple reset pulses to the gate driver 821 in each partial refresh frame period to clear the scan pulses in the gate driver 821 at different time points. Therefore, in each partial refresh frame period, only the pixel data in the high refresh rate display area 831 of the display panel 830 is refreshed, while the pixel data in the low refresh rate display area 832 of the display panel 830 remains unchanged (not refreshed). Based on the control on the gate driver 821 by the display driving chip 810, the high refresh rate display area 831 of the display panel 830 has a high frame rate (for example, 120 Hz), while the low refresh rate display area 832 of the display panel 830 has a low frame rate (for example, 40 Hz). Therefore, the display apparatus 800 may maintain a high refresh rate in the high refresh rate display area 831 while reducing the refresh rate of the low refresh rate display area 832 to reduce power consumption.

Similarly, the display driving chip 810 sends a single reset pulse to the gate driver 822 in each full refresh frame period to clear the scan pulses in the gate driver 822. The display driving chip 810 sends multiple reset pulses to the gate driver 822 in each partial refresh frame period to clear the scan pulses in the gate driver 822 at different time points. Therefore, in each partial refresh frame period, only the pixel data in the high refresh rate display area 833 of the display panel 830 is refreshed, while the pixel data in the low refresh rate display area 834 of the display panel 830 remains unchanged (not refreshed). Based on the control on the gate driver 822 by the display driving chip 810, the high refresh rate display area 833 of the display panel 830 has a high frame rate (for example, 120 Hz), while the low refresh rate display area 834 of the display panel 830 has a low frame rate (for example, 80 Hz). Therefore, the display apparatus 800 may maintain a high refresh rate in the high refresh rate display area 833 while reducing the refresh rate of the low refresh rate display area 834 to reduce power consumption.

Figure 9:
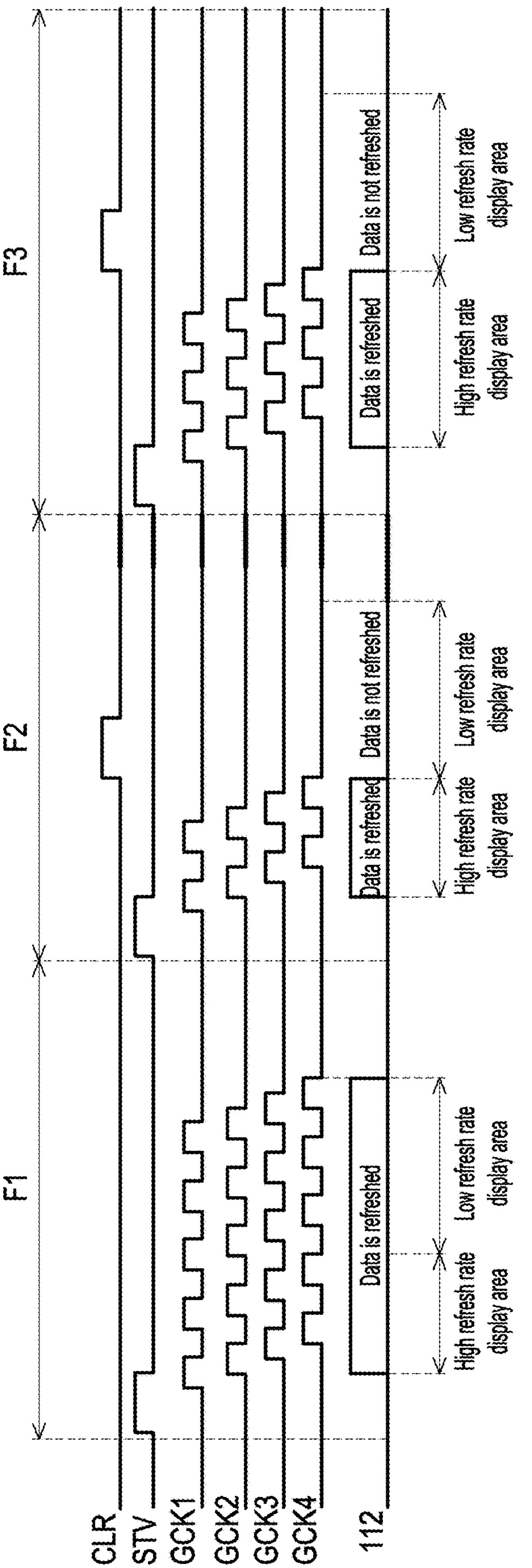
FIG. 9 is a schematic signal timing diagram of a gate driver according to yet another embodiment of the present disclosure.

FIG. 9 is a schematic signal timing diagram of a gate driver 120 according to yet another embodiment of the present disclosure. The horizontal axis of FIG. 9 represents time. In the embodiment shown in FIG. 9, the number of reset pulses in each full refresh frame period is 0, and the number of reset pulses in each partial refresh frame period is 1. The frame period F1 shown in the left part of FIG. 9 is the full refresh frame period (normal display frame). In the frame period F1, when there is no reset pulse CLR, all display areas (all partitions) of the display panel 130 are refreshed normally. The frame period F2 shown in the middle of FIG. 9 is the first partial refresh frame period. In the frame period F2, the gate driver 120 only scans the high refresh rate display area of the display panel 130. After the gate driver 120 completes refreshing the high refresh rate display area in the frame period F2, the controller 111 stops the toggling behavior on the gate clock signal GCK. In the frame period F2, after the gate driver 120 refreshes the high refresh rate display area, the controller 111 sends the reset pulse CLR to the gate driver 120 to reset all shift registers of the gate driver 120 (reset the voltage of the node PU of the shift registers).

The frame period F3 shown in the right part of FIG. 9 is the second partial refresh frame period. In the frame period F3, the gate driver 120 scans the high refresh rate display area and does not scan the low refresh rate display area. Description of the frame period F3 and the third time point t3 may be derived from the relevant description of the frame period F2 and the second time point t2 by analogy, so no further description will be incorporated herein. In the frame period F3, the controller 111 controls the gate driver 120 so that the boundary between the high refresh rate display area and the low refresh rate display area in the frame period F2 (the first partial refresh frame period) is different from the boundary between the high refresh rate display area and the low refresh rate display area in the frame period F3 (the second partial refresh frame period).

Figure 10:
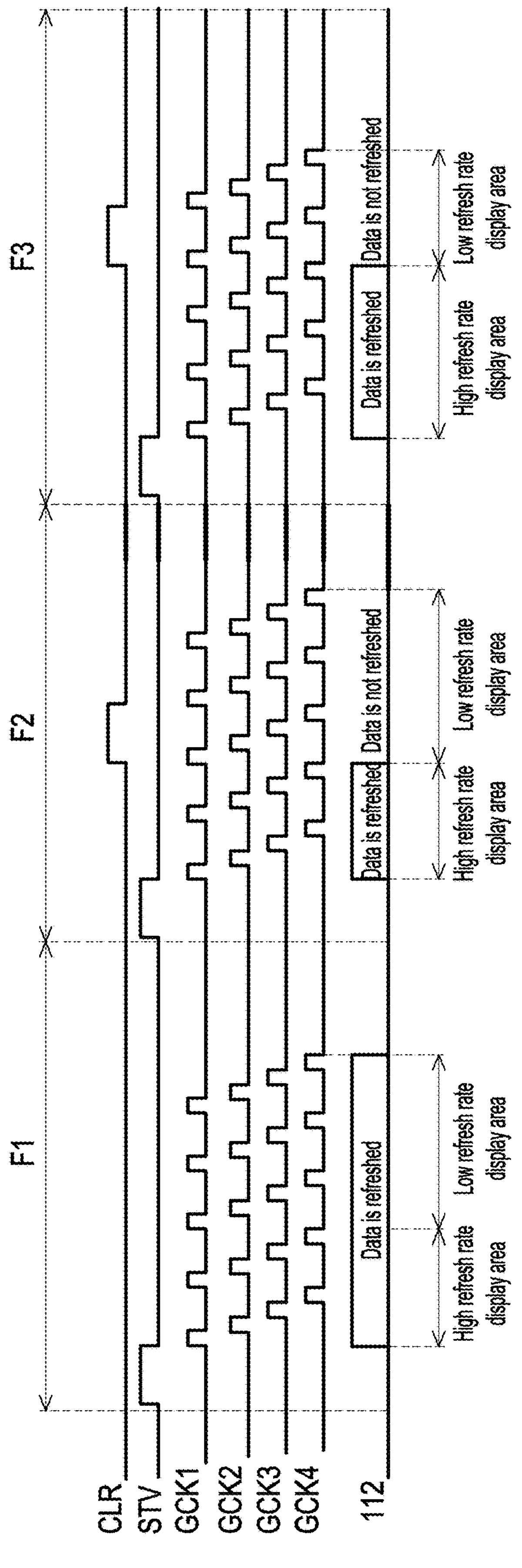
FIG. 10 is a schematic signal timing diagram of a gate driver according to yet another embodiment of the present disclosure.

FIG. 10 is a schematic signal timing diagram of a gate driver 120 according to yet another embodiment of the present disclosure. The horizontal axis of FIG. 10 represents time. In the embodiment shown in FIG. 10, the number of reset pulses in each full refresh frame period is 0, and the number of reset pulses in each partial refresh frame period is 1. The frame period F1 shown in the left part of FIG. 10 is the full refresh frame period (normal display frame). In the frame period F1, when there is no reset pulse CLR, all display areas of the display panel 130 are refreshed normally. The frame period F2 shown in the middle of FIG. 10 is the first partial refresh frame period. In the frame period F2, the gate driver 120 only scans the high refresh rate display area of the display panel 130. After refreshing the high refresh rate display area in the frame period F2, the controller 111 does not stop the toggling behavior on the gate clock signal GCK. After refreshing the high refresh rate display area in the frame period F2, the controller 111 sends the reset pulse CLR to the gate driver 120 to reset all shift registers of the gate driver 120 (i.e., reset the voltage of the node PU of the shift registers).

The frame period F3 shown in the right part of FIG. 10 is the second partial refresh frame period. In the frame period F3, the gate driver 120 scans the high refresh rate display area and does not scan the low refresh rate display area. Description of the frame period F3 may be derived from the relevant description of the frame period F2 by analogy, so no further description will be incorporated herein. In the frame period F3, the controller 111 controls the gate driver 120 so that the boundary between the high refresh rate display area and the low refresh rate display area in the frame period F2 (the first partial refresh frame period) is different from the boundary between the high refresh rate display area and the low refresh rate display area in the frame period F3 (the second partial refresh frame period).

Figure 11:
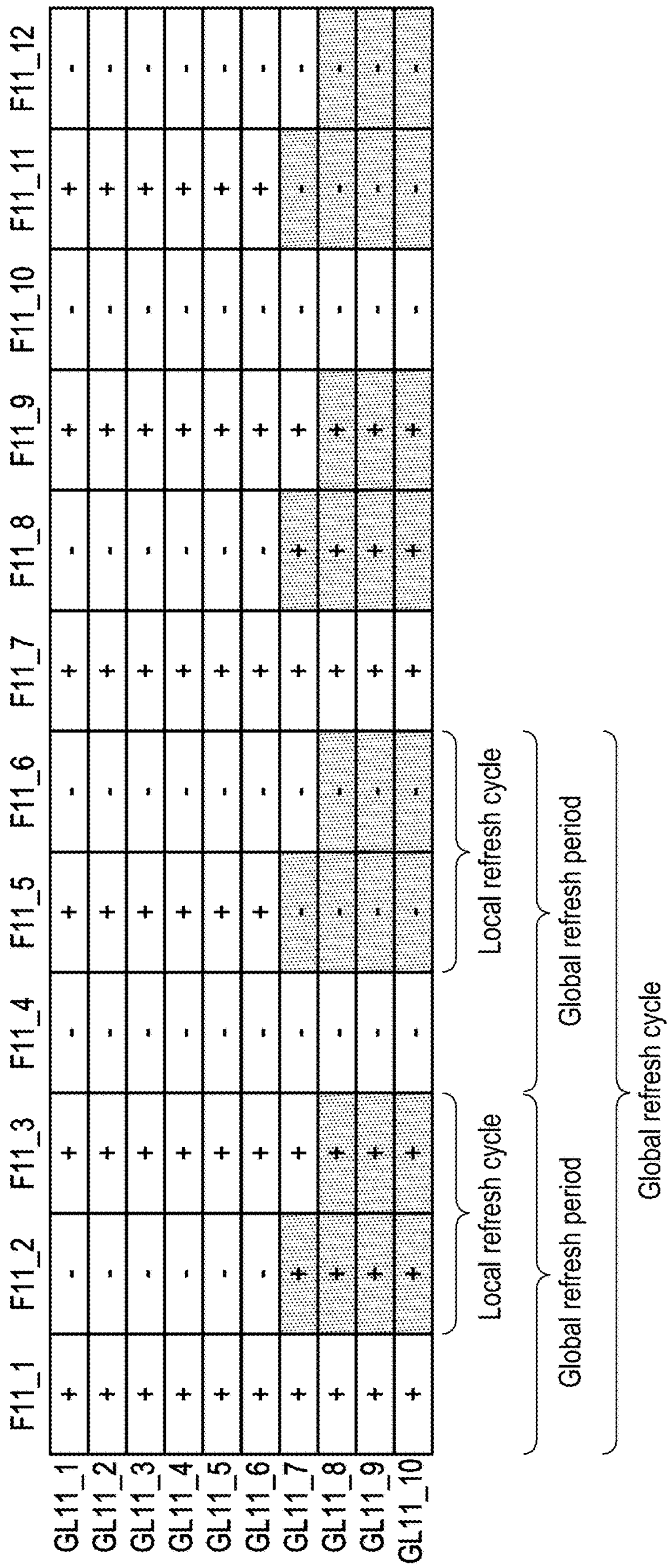
FIG. 11 is a schematic diagram illustrating dynamic changes in the boundary position between a high refresh rate display area and a low refresh rate display area according to an embodiment of the present disclosure.

FIG. 11 is a schematic diagram illustrating dynamic changes in the boundary position between a high refresh rate display area and a low refresh rate display area according to an embodiment of the present disclosure. The horizontal axis of FIG. 11 represents time. In FIG. 11, "+" represents positive polarity driving, and "−" represents negative polarity driving. GL11_1, GL11_2, GL11_3, GL11_4, GL11_5, GL11_6, GL11_7, GL11_8, GL11_9 and GL11_10 shown in FIG. 11 represent different horizontal display lines of the display panel 130. The horizontal display lines are driven by scan signals on the scan line such as GL1, GL2 and GL3 shown in FIG. 3. Description of scan lines may be derived from relevant descriptions of scan lines GL1, GL2 and GL3 shown in FIG. 3 by analogy. FIG. 11 shows multiple frame periods F11_1, F11_2, F11_3, F11_4, F11_5, F11_6, F11_7, F11_8, F11_9, F11_10, F11_11 and F11_12, wherein the frame periods F11_1, F11_4, F11_7 and F11_10 are full refresh frame periods (which are referred to the relevant description of the frame period F1 shown in FIG. 4 by analogy), the frame periods F11_2, F11_5, F11_8 and F11_11 are the first partial refresh frame periods (which are referred to the relevant description of the frame period F2 shown in FIG. 4 by analogy), and the frame periods F11_3, F11_6, F11_9 and F11_12 are the second partial refresh frame periods (which are referred to the relevant description of the frame period F3 shown in FIG. 4 by analogy).

The partial refresh frame period(s) between the last (or the only) full refresh frame period in a full-partial refresh period and the first full refresh frame period in the next full-partial refresh period is regarded as a partial refresh cycle. For example, the frame periods F11_2 and F11_3 between the frame periods F11_1 and F11_4 are taken as the first partial refresh cycle, the frame periods F11_5 and F11_6 between the frame periods F11_4 and F11_7 are taken as the second partial refresh cycle, and the frame periods F11_8 and F11_9 between the frame periods F11_7 and F11_10 are taken as the third partial refresh cycle. The full refresh frame period and the partial refresh cycle adjacent to each other are taken as one full-partial refresh period. For example, the frame periods F11_1 to F11_3 are taken as the first full-partial refresh period, the frame periods F11_4 to F11_6 are taken as the second full-partial refresh period, the frame periods F11_7 to F11_9 are taken as the third full-partial refresh period, and the frame periods F11_10 to F11_12 are taken as the fourth full-partial refresh period. Multiple full-partial refresh periods that complete positive and negative polarity changes are one full-partial refresh cycle. For example, the frame periods F11_1 to F11_6 are taken as the first full-partial refresh cycle, and the frame periods F11_7 to F11_12 are taken as the second full-partial refresh cycle.

In each partial refresh cycle, the boundary between the high refresh rate display area and the low refresh rate display area in the first partial refresh frame period is different from the boundary between the high refresh rate display area and the low refresh rate display area in the second partial refresh frame period. For example, the boundary between the high refresh rate display area (horizontal display lines GL11_1 to GL11_6) and the low refresh rate display area (horizontal display lines GL11_7 to GL11_10) in the frame period F11_2 is different from the boundary between the high refresh rate display area (horizontal display lines GL11_1 to GL11_7) and the low refresh rate display area (horizontal display lines GL11_8 to GL11_10) in the frame period F11_3. Description of other partial refresh cycles may be derived from the relevant descriptions of frame periods F11_2 and F11_3 by analogy, so the details will not be described again.

In an application example in which the display panel 130 is a liquid crystal display panel, the liquid crystal display panel needs to maintain polarity balance so that there will be no charge residual problem caused by polarity imbalance; if there is a charge residual problem, the panel will flicker. By controlling the time point of the additional reset pulse or the time point when the gate clock signal stops toggling, the controller 111 may dynamically change the boundary between the high refresh rate display area and the low refresh rate display area during the partial refresh frame period, and balance the positive and negative polarities of the data voltage of each horizontal display line of the display panel 130 within a full-partial refresh cycle. The full-partial refresh cycle at least includes two full refresh frame periods (for example, frame periods F11_1 and F11_4), and the positive and negative polarity changes of the data voltage of a whole frame are completed once in the two full refresh frame periods.

Each full-partial refresh period includes N full refresh frame periods and subsequent M partial refresh frame periods, wherein N>=1 and M>=1. When the number of settings of the boundary between the high refresh rate display area and the low refresh rate display area is not greater than the number M of partial refresh frame periods in the full-partial refresh period, the controller 111 may control the gate driver 120 so that the boundary change sequence in each full-partial refresh period is the same. In the embodiment shown in FIG. 11, N is 1 and M is 2, and the number of settings of the boundary is 2 (i.e., the boundaries dynamically change between two different positions). Therefore, the boundary change sequence in each full-partial refresh period shown in FIG. 11 is the same.

When the boundary position is dynamically changed, the embodiment shown in FIG. 11 may maintain the polarity balance of the data voltage of each pixel row in each full-partial refresh period. For example, the horizontal display line GL11_1 has a total of 6 times (in 6 frame periods) of positive polarity driving and 6 times (in another 6 frame periods) of negative polarity driving in the frame periods F11_1 to F11_12, so polarity balance is achieved. In another example, the horizontal display line GL11_7 has a total of 6 times of positive polarity driving and 6 times of negative polarity driving in the frame periods F11_1 to F11_12, so polarity balance is achieved.

Figure 12:
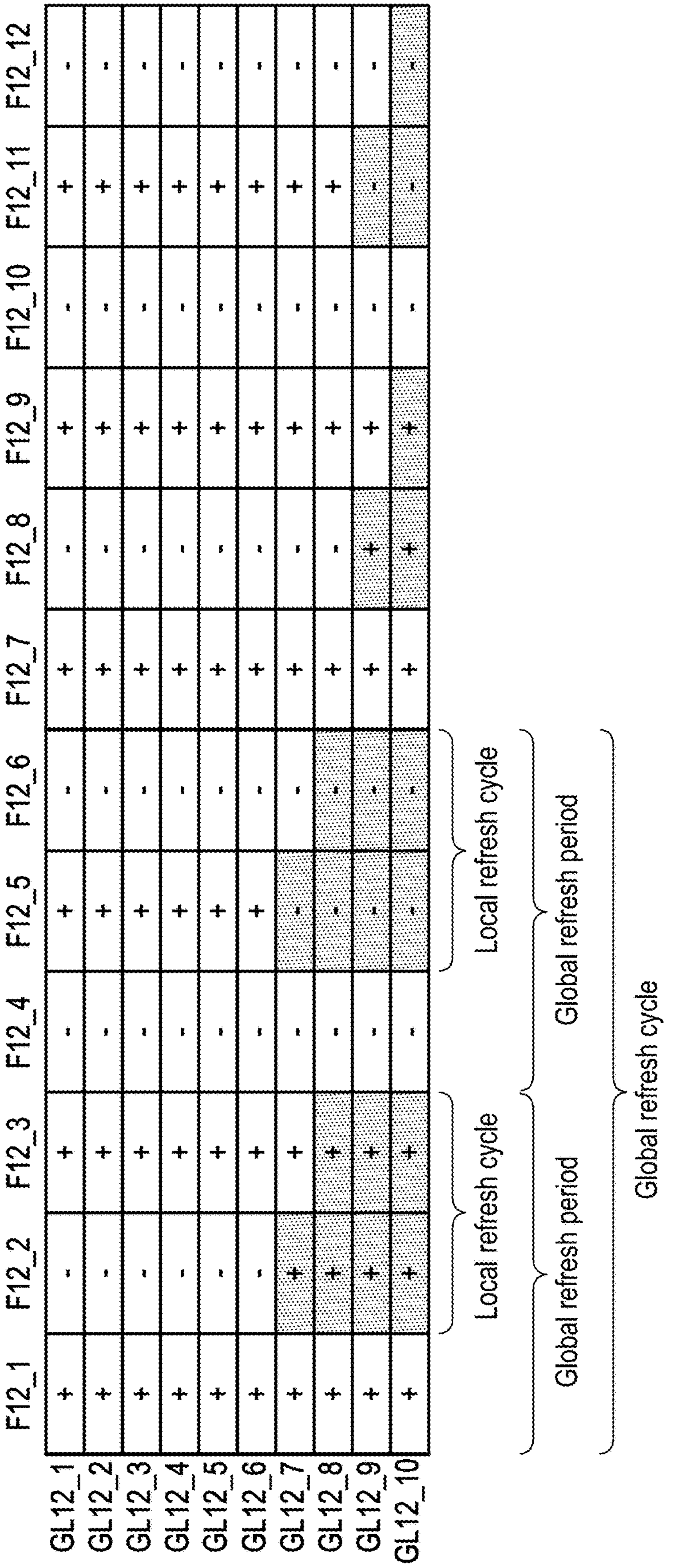
FIG. 12 is a schematic diagram illustrating dynamic changes in the boundary position between the high refresh rate display area and the low refresh rate display area according to another embodiment of the present disclosure.

FIG. 12 is a schematic diagram illustrating dynamic changes in the boundary position between the high refresh rate display area and the low refresh rate display area according to another embodiment of the present disclosure. The horizontal axis of FIG. 12 represents time. In FIG. 12, "+" represents positive polarity driving, and "−" represents negative polarity driving. GL12_1, GL12_2, GL12_3, GL12_4, GL12_5, GL12_6, GL12_7, GL12_8, GL12_9 and GL12_10 shown in FIG. 12 represent different horizontal display lines of the display panel 130. The horizontal display lines are driven by scan signals on the scan line such as GL1, GL2 and GL3 shown in FIG. 3. Description of scan lines may be derived from the relevant descriptions of scan lines GL1, GL2 and GL3 shown in FIG. 3 by analogy. FIG. 12 shows multiple frame periods F12_1, F12_2, F12_3, F12_4, F12_5, F12_6, F12_7, F12_8, F12_9, F12_10, F12_11 and F12_12, wherein the frame periods F12_1, F12_4, F12_7 and F12_10 are the full refresh frame periods (which are referred to the relevant description of the frame period F1 shown in FIG. 4 by analogy), the frame periods F12_2, F12_5, F12_8 and F12_11 are the first partial refresh frame periods (which are referred to the relevant description of the frame period F2 shown in FIG. 4 by analogy), and the frame periods F12_3, F12_6, F12_9 and F12_12 are the second partial refresh frame periods (which are referred to the relevant description of the frame period F3 shown in FIG. 4 by analogy).

Description of the embodiment shown in FIG. 12 may be derived from the relevant description of the embodiment shown in FIG. 11 by analogy. Different from the embodiment shown in FIG. 11 where the number of settings of the boundary is 2, the number of settings of the boundary in the embodiment shown in FIG. 12 is 4 (i.e., the boundaries are dynamically changed between four different positions). The first boundary position is between the horizontal display lines GL12_6 and GL12_7, the second boundary position is between the horizontal display lines GL12_7 and GL12_8, the third boundary position is between the horizontal display lines GL12_8 and GL12_9, and the fourth boundary position is between the horizontal display lines GL12_9 and GL12_10.

Each full-partial refresh period includes N full refresh frame periods and subsequent M partial refresh frame periods, wherein N>=1 and M>=1. When the number of settings of the boundary between the high refresh rate display area and the low refresh rate display area is greater than the number M of the partial refresh frame periods in the full-partial refresh period, the controller 111 controls the gate driver 120 so that the boundary change sequence in the first full-partial refresh cycle is different from the boundary change sequence in the second full-partial refresh cycle, wherein each of the first full-partial refresh cycle and the second full-partial refresh cycle includes at least one full-partial refresh period. In the embodiment shown in FIG. 12, N is 1 and M is 2, and the number of settings of the boundary is 4 (i.e., the boundaries are dynamically changed between four different positions). Therefore, the controller 111 controls the gate driver 120 such that the boundary change sequence in the first full-partial refresh cycle (frame periods F12_1 to F12_6) is different from the boundary change sequence in the second full-partial refresh cycle (frame periods F12_7 to F12_12).

Figure 13:
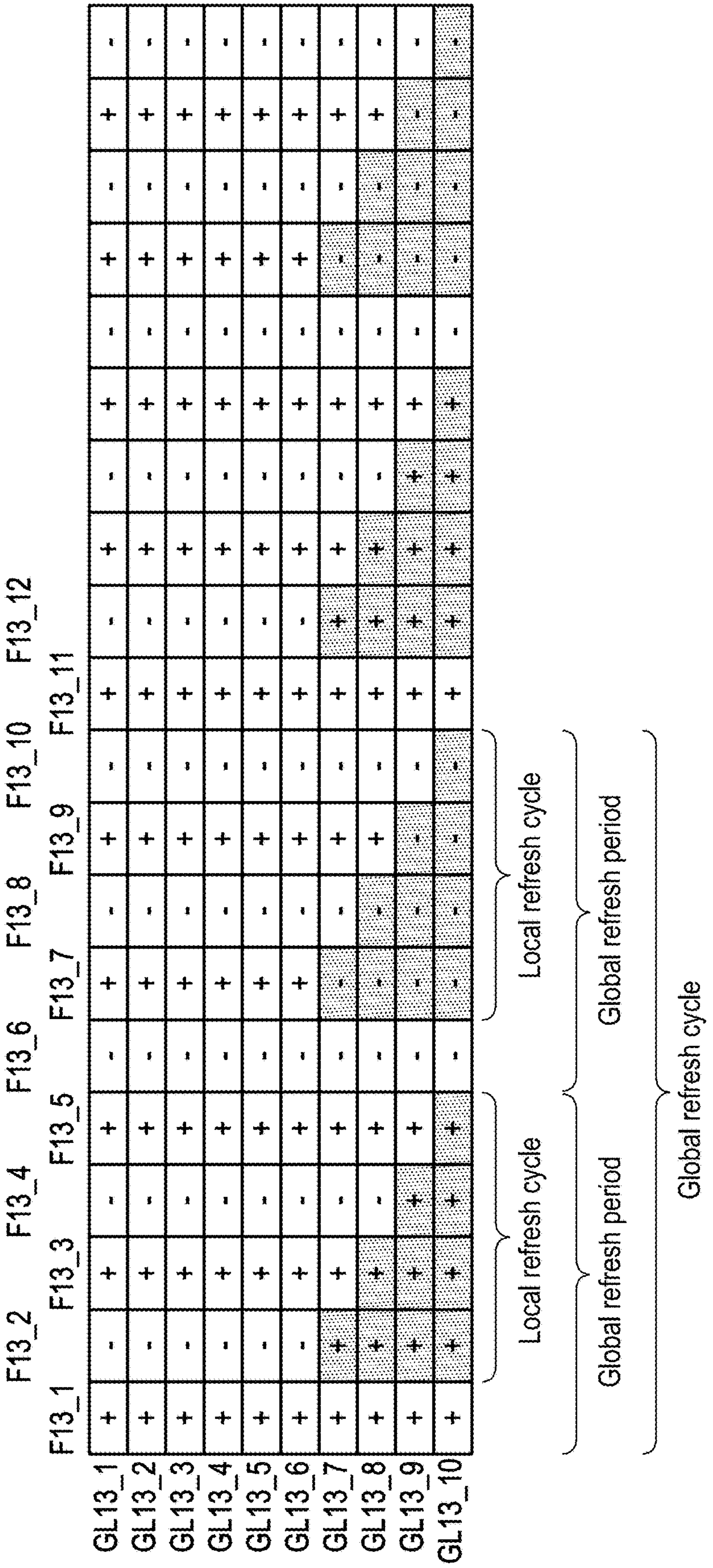
FIG. 13 is a schematic diagram illustrating dynamic changes in the boundary position between the high refresh rate display area and the low refresh rate display area according to still another embodiment of the present disclosure.

FIG. 13 is a schematic diagram illustrating dynamic changes in the boundary position between the high refresh rate display area and the low refresh rate display area according to still another embodiment of the present disclosure. The horizontal axis of FIG. 13 represents time. In FIG. 13, "+" represents positive polarity driving, and "−" represents negative polarity driving. GL13_1, GL13_2, GL13_3, GL13_4, GL13_5, GL13_6, GL13_7, GL13_8, GL13_9 and GL13_10 shown in FIG. 13 represent different horizontal display lines of the display panel 130. The horizontal display lines are driven by scan signals on the scan line such as GL1, GL2 and GL3 shown in FIG. 3. Description of scan lines may be derived from relevant descriptions of scan lines GL1, GL2 and GL3 shown in FIG. 3 by analogy. FIG. 13 shows multiple frame periods F13_1, F13_2, F13_3, F13_4, F13_5, F13_6, F13_7, F13_8, F13_9, F13_10, F13_11 and F13_12, wherein the frame periods F13_1, F13_6 and F13_14 are the full refresh frame periods (which are referred to the relevant description of the frame period F1 shown in FIG. 4 by analogy), the frame periods F13_2, F13_7 and F13_12 are the first partial refresh frame periods (which are referred to the relevant description of the frame period F2 shown in FIG. 4 by analogy), the frame periods F13_3 and F13_8 are the second partial refresh frame periods (which are referred to the relevant description of the frame period F3 shown in FIG. 4 by analogy), the frame periods F13_4 and F13_9 are the third partial refresh frame periods, and the frame periods F13_5 and F13_10 are the fourth partial refresh frame periods.

Description of the embodiment shown in FIG. 13 may be derived from the relevant description of the embodiment shown in FIG. 11 by analogy. In the embodiment shown in FIG. 13, the number of settings of the boundary is 4 and one partial refresh cycle has 4 partial refresh frame periods. The first boundary position is between the horizontal display lines GL13_6 and GL13_7, the second boundary position is between the horizontal display lines GL13_7 and GL13_8, the third boundary position is between the horizontal display lines GL13_8 and GL13_9, and the fourth boundary position is between the horizontal display lines GL13_9 and GL13_10. In the embodiment shown in FIG. 13, the number N of the full refresh frame periods in each full-partial refresh period is 1, the number M of the partial refresh frame periods in each full-partial refresh period is 4, and the number of settings of the boundary is 4 (i.e., the boundaries are dynamically changed between four different positions). Because the number of settings of the boundary between the high refresh rate display area and the low refresh rate display area is not greater than the number M of the partial refresh frame periods in the full-partial refresh period, the boundary change sequence in each full-partial refresh period shown in FIG. 13 is the same.

Figure 14:
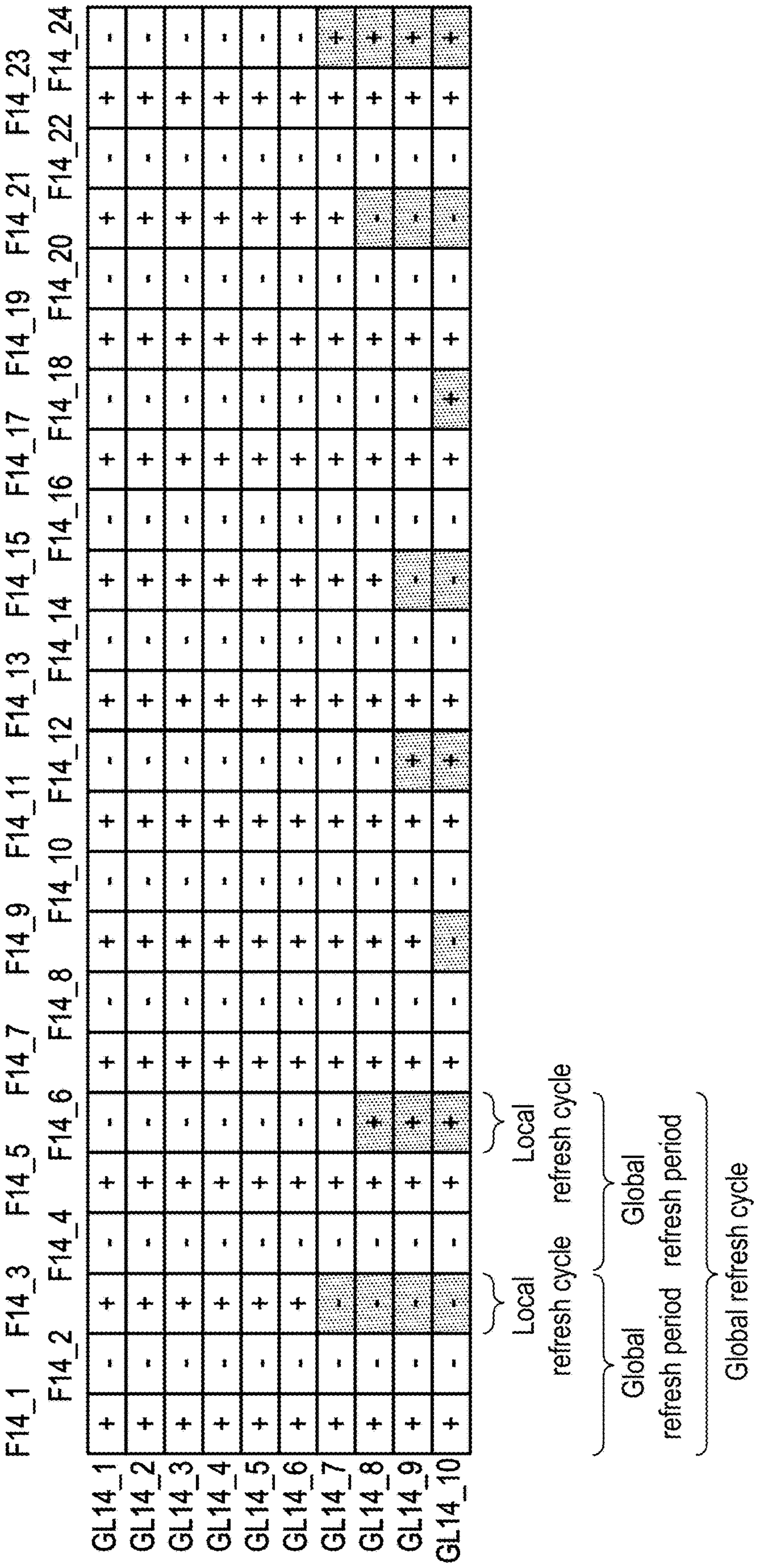
FIG. 14 is a schematic diagram illustrating dynamic changes in the boundary position between the high refresh rate display area and the low refresh rate display area according to yet another embodiment of the present disclosure.

FIG. 14 is a schematic diagram illustrating dynamic changes in the boundary position between the high refresh rate display area and the low refresh rate display area according to yet another embodiment of the present disclosure. The horizontal axis of FIG. 14 represents time. In FIG. 12, "+" represents positive polarity driving, and "−" represents negative polarity driving. GL14_1, GL14_2, GL14_3, GL14_4, GL14_5, GL14_6, GL14_7, GL14_8, GL14_9 and GL14_10 shown in FIG. 14 represent different horizontal display lines of the display panel 130. The horizontal display lines are driven by scan signals on the scan line such as GL1, GL2 and GL3 shown in FIG. 3. Description of scan lines may be derived from relevant descriptions of scan lines GL1, GL2 and GL3 shown in FIG. 3 by analogy. FIG. 14 shows multiple frame periods F14_1, F14_2, F14_3, F14_4, F14_5, F14_6, F14_7, F14_8, F14_9, F14_10, F14_11, F14_12, F14_13, F14_14, F14_15, F14_16, F14_17, F14_18, F14_19, F14_20, F14_21, F14_22, F14_23 and F14_24, wherein the frame periods F14_1, F14_2, F14_4, F14_5, F14_7, F14_8, F14_10, F14_11, F14_13, F14_14, F14_16, F14_17, F14_19, F14_20, F14_22 and F14_23 are full refresh frame periods (which are referred to the relevant description of the frame period F1 shown in FIG. 4 by analogy), and the frame periods F14_3, F14_6, F14_9, F14_12, F14_15, F14_18, F14_21 and F14_24 are the partial refresh frame periods (which are referred to the relevant description of the frame period F2 shown in FIG. 4 by analogy).

Description of the embodiment shown in FIG. 14 may be derived from the relevant description of the embodiment shown in FIG. 11 by analogy. In the embodiment shown in FIG. 14, the number of settings of the boundary is 4 and there is only one partial refresh frame period. The first boundary position is between the horizontal display lines GL14_6 and GL14_7, the second boundary position is between the horizontal display lines GL14_7 and GL14_8, the third boundary position is between the horizontal display lines GL14_8 and GL14_9, and the fourth boundary position is between the horizontal display lines GL14_9 and GL14_10. In the embodiment shown in FIG. 14, the number N of the full refresh frame periods in each full-partial refresh period is 2, the number M of the partial refresh frame periods in each full-partial refresh period is 1, and the number of settings of the boundary is 4 (i.e., the boundaries are dynamically changed between four different positions). Because the number of setting of the boundary between the high refresh rate display area and the low refresh rate display area is greater than the number M of the partial refresh frame periods in the full-partial refresh period, the controller 111 controls the gate driver 120 so that different boundary change sequences are applied in different full-partial refresh cycles.

Figure 15:
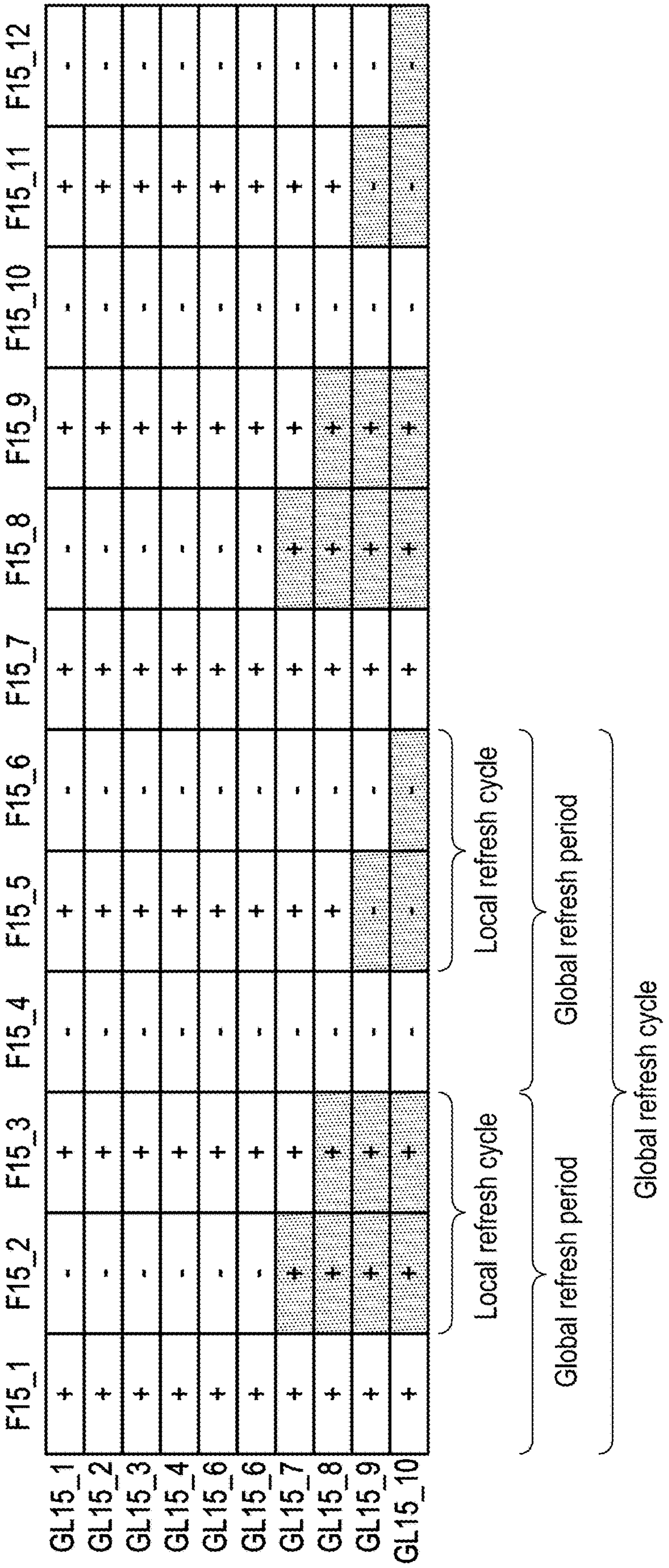
FIG. 15 is a schematic diagram illustrating dynamic changes in the boundary position between the high refresh rate display area and the low refresh rate display area according to yet another embodiment of the present disclosure.

FIG. 15 is a schematic diagram illustrating dynamic changes in the boundary position between the high refresh rate display area and the low refresh rate display area according to yet another embodiment of the present disclosure. The horizontal axis of FIG. 15 represents time. In FIG. 15, "+" represents positive polarity driving, and "−" represents negative polarity driving. GL15_1, GL15_2, GL15_3, GL15_4, GL15_5, GL15_6, GL15_7, GL15_8, GL15_9 and GL15_10 shown in FIG. 15 represent different horizontal display lines of the display panel 130. The horizontal display lines are driven by scan signals on the scan line such as GL1, GL2 and GL3 shown in FIG. 3. Description of scan lines may be derived from relevant descriptions of scan lines GL1, GL2 and GL3 shown in FIG. 3 by analogy. FIG. 15 shows multiple frame periods F15_1, F15_2, F15_3, F15_4, F15_5, F15_6, F15_7, F15_8, F15_9, F15_10, F15_11 and F15_12, wherein the frame periods F15_1, F15_4, F15_7 and F15_10 are full refresh frame periods (which are referred to the relevant description of the frame period F1 shown in FIG. 4 by analogy), the frame periods F15_2, F15_5, F15_8 and F15_11 are the first partial refresh frame periods (which are referred to the relevant description of the frame period F2 shown in FIG. 4 by analogy), and the frame periods F15_3, F15_6, F15_9 and F15_12 are the second partial refresh frame periods (which are referred to the relevant description of the frame period F3 shown in FIG. 4 by analogy).

The number and position of the boundary in the embodiment shown in FIG. 15 are similar to those shown in FIG. 12. The number N of the full refresh frame periods in each full-partial refresh period is 1, the number M of the partial refresh frame periods in each full-partial refresh period is 2, and the number of settings of the boundary is 4. The boundaries are dynamically changed between four different positions. The first boundary position is between the horizontal display lines GL15_6 and GL15_7, the second boundary position is between the horizontal display lines GL15_7 and GL15_8, the third boundary position is between the horizontal display lines GL15_8 and GL15_9, and the fourth boundary position is between the horizontal display lines GL15_9 and GL15_10. However, in the embodiment shown in FIG. 15, the controller 111 does not control the gate driver 120 to change the boundary change sequence according to the full-partial refresh cycle as shown in FIG. 12, but applies different boundary change sequences in different full-partial refresh periods, which causes polarity imbalance. For example, it may be seen that, in the full-partial refresh cycle (F15_1 to F15_6) or in the next full-partial refresh cycle (F15_7 to F15_14), the number of frame periods in which the horizontal display lines GL15_7 and GL15_8 are maintained in positive polarity is more than the number of frame periods in which the horizontal display lines GL15_7 and GL15_8 are maintained in negative polarity.

Figure 16:
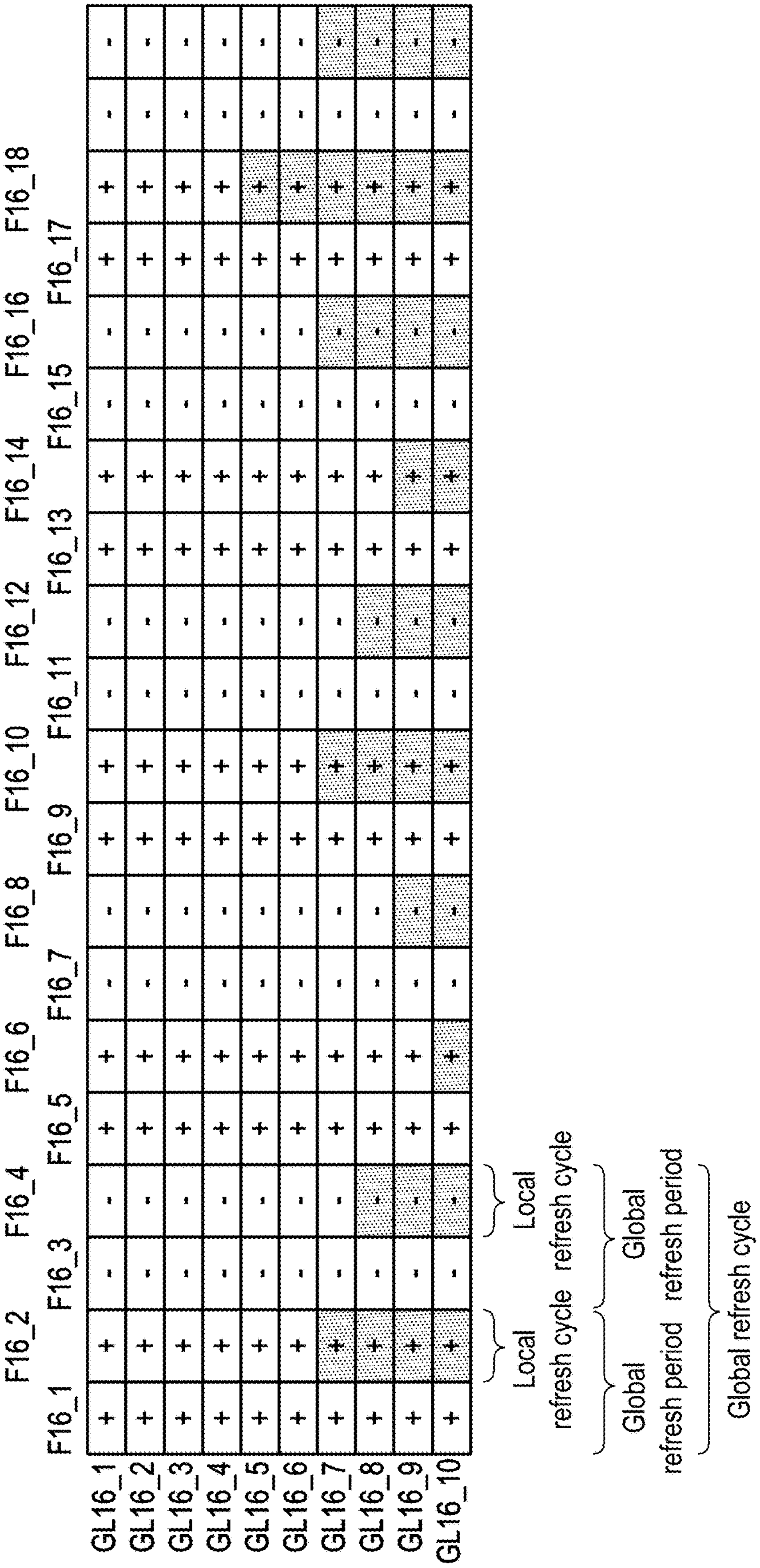
FIG. 16 is a schematic diagram illustrating dynamic changes in the boundary position between the high refresh rate display area and the low refresh rate display area according to yet another embodiment of the present disclosure.

FIG. 16 is a schematic diagram illustrating dynamic changes in the boundary position between the high refresh rate display area and the low refresh rate display area according to yet another embodiment of the present disclosure. The horizontal axis of FIG. 16 represents time. In FIG. 16, "+" represents positive polarity driving, and "−" represents negative polarity driving. GL16_1, GL16_2, GL16_3, GL16_4, GL16_5, GL16_6, GL16_7, GL16_8, GL16_9 and GL16_10 shown in FIG. 16 represent different horizontal display lines of the display panel 130. The horizontal display lines are driven by scan signals on the scan line such as GL1, GL2 and GL3 shown in FIG. 3. Description of scan lines may be derived from relevant descriptions of scan lines GL1, GL2 and GL3 shown in FIG. 3 by analogy. FIG. 16 shows multiple frame periods F16_1, F16_2, F16_3, F16_4, F16_5, F16_6, F16_7, F16_8, F16_9, F16_10, F16_11, F16_12, F16_13, F16_14, F16_15, F16_16, F16_17 and F16_18, wherein the frame periods F16_1, F16_3, F16_5, F16_7, F16_9, F16_11, F16_13, F16_15 and F16_17 are the full refresh frame periods (which are referred to the relevant description of the frame period F1 shown in FIG. 4 by analogy), and the frame periods F16_2, F16_4, F16_6, F16_8, F16_10, F16_12, F16_14, F16_16 and F16_18 are the partial refresh frame periods (which are referred to the relevant description of the frame period F2 shown in FIG. 4 by analogy).

Description of the embodiment shown in FIG. 16 may be derived from the relevant description of the embodiment shown in FIG. 11 by analogy. Different from FIG. 11, in the embodiment shown in FIG. 16, the display driving chip 110 changes the positive and negative polarities of the output data voltage every two frame periods. The number N of the full refresh frame periods in each full-partial refresh period is 1, the number M of the partial refresh frame periods in each full-partial refresh period is 1, and the number of settings of the boundary is 5 (i.e., the boundaries are dynamically changed between five different positions). The first boundary position is between the horizontal display lines GL15_4 and GL15_5, the second boundary position is between the horizontal display lines GL15_6 and GL15_7, the third boundary position is between the horizontal display lines GL15_7 and GL15_8, the fourth boundary position is between the horizontal display lines GL15_8 and GL15_9, and the fifth boundary position is between the horizontal display lines GL15_9 and GL15_10. The number of boundary positions is 5 as an example because of the limited space in the drawings; in fact, the number of boundary positions may be any value up to the maximum number of boundary positions. When the display driving chip 110 changes the positive and negative polarities of the output data voltage every two frame periods, the controller 111 controls the gate driver 120, so that the boundary between the high refresh rate display area and the low refresh rate display area changes positions freely.

To sum up, the display driving chip 110 is able to refresh data in both the high refresh rate display area and the low refresh rate display area in the full refresh frame period. In the partial refresh frame period, data is refreshed in the high refresh rate display area and data is not refreshed in the low refresh rate display area. Therefore, the low refresh rate display area of the display area of the display panel 130 is not refreshed in each partial refresh frame period, so that the refresh rate of the low refresh rate display area of the display panel 130 may be different from that of the high refresh rate display area of the display panel 130. By controlling the gate driver 120 through the display driving chip 110, the display apparatus 100 is able to allow different display partitions in the same display panel to have different refresh rates adaptively. In addition, the display driving chip 110 may dynamically change the boundary position between the high refresh rate display area and the low refresh rate display area that are adjacent to each other to blur the visual effect differences at partition boundaries, thereby improving visual effects. By dynamically changing the boundary position between partitions, the display driving chip 110 may further reduce the aging difference of the display panel 130 on both sides of the boundary position between partitions.

Although the present disclosure has been disclosed above through embodiments, it is not intended to limit the present disclosure. Anyone with ordinary knowledge in the technical field can make some modifications and refinement without departing from the spirit and scope of the present disclosure. Therefore, the scope to be protected by the present disclosure shall be determined by the appended claims.

What is claimed is:

1. A display driving chip, comprising:

a controller configured to control a gate driver of a display panel to be driven by the display driving chip, wherein the gate driver is configured to drive a plurality of scan lines of the display panel, a display area of the display panel comprises a high refresh rate display area and a low refresh rate display area that are adjacent to each other, the display panel displays data in a plurality of frame periods of a full-partial refresh cycle, comprising at least two full refresh frame periods and at least two partial refresh frame periods, in the full refresh frame periods, both the high refresh rate display area and the low refresh rate display area are refreshed with the data, in the partial refresh frame periods, the data is refreshed in the high refresh rate display area and the data is not refreshed in the low refresh rate display area;

wherein the controller controls the gate driver so that in the full-partial refresh cycle, a boundary between the high refresh rate display area and the low refresh rate display area in a first partial refresh frame period is different from a boundary between the high refresh rate display area and the low refresh rate display area in a second partial refresh frame period, and the controller balances the number of times that each horizontal display line has a positive polarity and the number of times that each horizontal display line has a negative polarity in the full-partial refresh cycle.

2. The display driving chip according to claim 1, wherein in the first partial refresh frame period and the second partial refresh frame period, the controller sends a reset pulse to the gate driver at a first time point to start generating a plurality of scan pulses corresponding to the high refresh rate display area, after the data in the high refresh rate display area is refreshed in the first partial refresh frame period, the controller sends an additional reset pulse to the gate driver at a second time point to clear the scan pulses in the gate driver, and, after the data in the high refresh rate display area is refreshed in the second partial refresh frame period, the controller sends the additional reset pulse to the gate driver at a third time point to clear the scan pulses in the gate driver.

3. The display driving chip according to claim 2, wherein after the data in the high refresh rate display area is refreshed in the first partial refresh frame period or the second partial refresh frame period, the controller stops a toggling behavior on a plurality of gate clock signals output by the controller to the gate driver from a time point when the additional reset pulse is sent.

4. The display driving chip according claim 1, wherein in the first partial refresh frame period and the second partial refresh frame period, the controller sends a reset pulse to the gate driver at a first time point to start generating a plurality of scan pulses corresponding to the high refresh rate display area, and after the data in the high refresh rate display area is refreshed, the controller stops a toggling behavior on a plurality of gate clock signals output by the controller to the gate driver from a second time point and does not send an additional reset pulse to the gate driver.

5. The display driving chip according to claim 1, further comprising:

a source driver coupled to the controller, and configured to drive a plurality of data lines of the display panel based on a control of the controller, wherein the controller enables the source driver before a first time point in the first partial refresh frame period and the second partial refresh frame period, and the controller disables an analog domain circuit or a digital domain circuit of the source driver after at least one of a second time point in the first partial refresh frame period and a third time point in the second partial refresh frame period, wherein the first time point is a time point when the controller sends a reset pulse, and the second time point or the third time point is a time point when the controller sends an additional reset pulse or a time point when the controller stops a toggling behavior on a plurality of gate clock signals output to the gate driver, the additional reset pulse and the reset pulse are in a same frame period and the additional reset pulse is later than the reset pulse, and the second time point and the third time point take place after the high refresh rate display area finishes displaying.

6. The display driving chip according to claim 1, wherein the display panel is a liquid crystal display panel, by controlling a time point of an additional reset pulse or a time point when a gate clock signal stops toggling, the controller changes the boundary between the high refresh rate display area and the low refresh rate display area during the partial refresh frame period.

7. The display driving chip according to claim 6, wherein polarity inversion of a whole frame is completed once in the two full refresh frame periods.

8. The display driving chip according to claim 6, wherein the full-partial refresh cycle comprises two full-partial refresh periods, each of the full-partial refresh periods comprises N full refresh frame periods and subsequent M partial refresh frame periods, wherein N>=1 and M>=1, and when the number of settings of the boundary between the high refresh rate display area and the low refresh rate display area is not greater than the number (M) of the partial refresh frame periods in the full-partial refresh period, the controller controls the gate driver so that a boundary change sequence in each of the full-partial refresh periods is the same.

9. The display driving chip according to claim 6, wherein the plurality of frame periods comprise a plurality of full-partial refresh periods, each of the full-partial refresh periods comprises N full refresh frame periods and subsequent M partial refresh frame periods, wherein N>=1 and M>=1, and when the number of settings of the boundary between the high refresh rate display area and the low refresh rate display area is greater than the number (M) of the partial refresh frame periods in the full-partial refresh period, the controller controls the gate driver so that a boundary change sequence in a first full-partial refresh cycle is different from a boundary change sequence in a second full-partial refresh cycle, wherein each of the first full-partial refresh cycle and the second full-partial refresh cycle comprises at least one full-partial refresh period.

10. The display driving chip according to claim 6, wherein when the display driving chip changes the positive and negative polarities of the data voltage that is output every two frame periods, the controller controls the gate driver, so that the boundary between the high refresh rate display area and the low refresh rate display area changes positions freely.

11. A display driving method, comprising:

controlling a display panel and a gate driver by a display driving chip so that the display panel displays data in a plurality of frame periods of a full-partial refresh cycle, wherein a display area of the display panel comprises a high refresh rate display area and a low refresh rate display area that are adjacent to each other, and the full-partial refresh cycle comprises at least two full refresh frame periods and at least two partial refresh frame periods;

controlling the gate driver by a controller of the display driving chip, so that both the high refresh rate display area and the low refresh rate display area are refreshed with the data in the full refresh frame periods, and the data is refreshed in the high refresh rate display area and the data is not refreshed in the low refresh rate display area in the partial refresh frame periods;

controlling the gate driver by the controller so that in the full-partial refresh cycle, a boundary between the high refresh rate display area and the low refresh rate display area in a first partial refresh frame period is different from a boundary between the high refresh rate display area and the low refresh rate display area in a second partial refresh frame period; and balancing the number of times that each horizontal display line has a positive polarity and the number of times that each horizontal dispel line has a negative polarity in the full-partial refresh cycle.

12. The display driving method according to claim 11, further comprising:

in the first partial refresh frame period and the second partial refresh frame period, the controller sends a reset pulse to the gate driver at a first time point to start generating a plurality of scan pulses corresponding to the high refresh rate display area, after the data in the high refresh rate display area is refreshed in the first partial refresh frame period, the controller sends an additional reset pulse to the gate driver at a second time point to clear the scan pulses in the gate driver, and, after the data in the high refresh rate display area is refreshed in the second partial refresh frame period, the controller sends the additional reset pulse to the gate driver at a third time point to clear the scan pulses in the gate driver.

13. The display driving method according to claim 12, further comprising:

after the data in the high refresh rate display area is refreshed in the first partial refresh frame period or the second partial refresh frame period, the controller stops a toggling behavior on a plurality of gate clock signals output by the controller to the gate driver from a time point when the additional reset pulse is sent.

14. The display driving method according to claim 11, further comprising:

in the first partial refresh frame period and the second partial refresh frame period, the controller sends a reset pulse to the gate driver at a first time point to start generating a plurality of scan pulses corresponding to the high refresh rate display area, and after the data in the high refresh rate display area is refreshed, the controller stops a toggling behavior on a plurality of gate clock signals output by the controller to the gate driver from a second time point and does not send an additional reset pulse to the gate driver.

15. The display driving method according to claim 11, further comprising:

driving a plurality of data lines of the display panel by a source driver of the display driving chip based on a control of the controller, enabling the source driver by the controller before a first time point in the first partial refresh frame period and the second partial refresh frame period, and disabling an analog domain circuit or a digital domain circuit of the source driver by the controller after at least one of a second time point in the first partial refresh frame period and a third time point in the second partial refresh frame period, wherein the first time point is a time point when the controller sends a reset pulse, and the second time point or the third time point is a time point when the controller sends an additional reset pulse or a time point when the controller stops a toggling behavior on a plurality of gate clock signals output to the gate driver, the additional reset pulse and the reset pulse are in a same frame period and the additional reset pulse is later than the reset pulse, and the second time point and the third time point take place after the high refresh rate display area finishes displaying.

16. The display driving method according to claim 11, wherein the display panel is a liquid crystal display panel, and the display driving method further comprises:

controlling a time point of an additional reset pulse or a time point when a gate clock signal stops toggling by the controller to change the boundary between the high refresh rate display area and the low refresh rate display area during the partial refresh frame period.

17. The display driving method according to claim 16, wherein polarity inversion of a whole frame is completed once in the two full refresh frame periods.

18. The display driving method according to claim 16, wherein the full-partial refresh cycle comprises two full-partial refresh periods, each of the full-partial refresh periods comprises N full refresh frame periods and subsequent M partial refresh frame periods, wherein N>=1 and M>=1, wherein the display driving method further comprises:

when the number of settings of the boundary between the high refresh rate display area and the low refresh rate display area is not greater than the number (M) of the partial refresh frame periods in the full-partial refresh period, the controller controls the gate driver so that a boundary change sequence in each of the full-partial refresh periods is the same.

19. The display driving method according to claim 16, wherein the plurality of frame periods comprise a plurality of full-partial refresh periods, each of the full-partial refresh periods comprises N full refresh frame periods and subsequent M partial refresh frame periods, wherein N>=1 and M>=1, wherein the display driving method further comprises:

when the number of settings of the boundary between the high refresh rate display area and the low refresh rate display area is greater than the number (M) of the partial refresh frame periods in the full-partial refresh period, the controller controls the gate driver so that a boundary change sequence in a first full-partial refresh cycle is different from a boundary change sequence in a second full-partial refresh cycle, wherein each of the first full-partial refresh cycle and the second full-partial refresh cycle comprises at least one full-partial refresh period.

20. The display driving method according to claim 16, further comprising:

when the display driving chip changes the positive and negative polarities of the data voltage that is output every two frame periods, the controller controls the gate driver, so that the boundary between the high refresh rate display area and the low refresh rate display area changes positions freely.

21. A display apparatus, comprising:

a display panel, wherein a display area of the display panel comprises a high refresh rate display area and a low refresh rate display area that are adjacent to each other, the display panel displays data in a plurality of frame periods of a full-partial refresh cycle, the the full-partial refresh cycle comprises at least two full refresh frame periods and at least two partial refresh frame periods;

a gate driver coupled to a plurality of scan lines of the display panel, wherein the gate driver is configured to drive the plurality of scan lines of the display panel; and a display driving chip coupled to the gate driver, wherein the display driving chip controls the gate driver, so that both the high refresh rate display area and the low refresh rate display area are refreshed with the data in the full refresh frame periods, and the data is refreshed in the high refresh rate display area and the data is not refreshed in the low refresh rate display area in the partial refresh frame periods;

wherein the display driving chip controls the gate driver so that in the full-partial refresh cycle, a boundary between the high refresh rate display area and the low refresh rate display area in a first partial refresh frame period is different from a boundary between the high refresh rate display area and the low refresh rate display area in a second partial refresh frame period, and the display driving chip balances the number of times that each horizontal display line has a positive polarity and the number of times that each horizontal display line has a negative polarity in the full-partial refresh cycle.

22. The display apparatus according to claim 21, wherein the display driving chip comprises:

a controller configured to control the gate driver, wherein the controller controls the gate driver so that in the plurality of frame periods, the boundary between the high refresh rate display area and the low refresh rate display area in the first partial refresh frame period is different from the boundary between the high refresh rate display area and the low refresh rate display area in the second partial refresh frame period.

23. The display apparatus according to claim 22, wherein in the first partial refresh frame period and the second partial refresh frame period, the controller sends a reset pulse to the gate driver at a first time point to start generating a plurality of scan pulses corresponding to the high refresh rate display area, after the data in the high refresh rate display area is refreshed in the first partial refresh frame period, the controller sends an additional reset pulse to the gate driver at a second time point to clear the scan pulses in the gate driver, and, after the data in the high refresh rate display area is refreshed in the second partial refresh frame period, the controller sends the additional reset pulse to the gate driver at a third time point to clear the scan pulses in the gate driver.

24. The display apparatus according to claim 23, wherein after the data in the high refresh rate display area is refreshed in the first partial refresh frame period or the second partial refresh frame period, the controller stops a toggling behavior on a plurality of gate clock signals output by the controller to the gate driver from a time point when the additional reset pulse is sent.

25. The display apparatus according to claim 22, wherein in the first partial refresh frame period and the second partial refresh frame period, the controller sends a reset pulse to the gate driver at a first time point to start generating a plurality of scan pulses corresponding to the high refresh rate display area, and after the data in the high refresh rate display area is refreshed, the controller stops a toggling behavior on a plurality of gate clock signals output by the controller to the gate driver from a second time point and does not send an additional reset pulse to the gate driver.

26. The display apparatus according to claim 22, wherein the display driving chip further comprises:

a source driver coupled to the controller, and configured to drive a plurality of data lines of the display panel based on a control of the controller, wherein the controller enables the source driver before a first time point in the first partial refresh frame period and the second partial refresh frame period, and the controller disables an analog domain circuit or a digital domain circuit of the source driver after at least one of a second time point in the first partial refresh frame period and a third time point in the second partial refresh frame period, wherein the first time point is a time point when the controller sends a reset pulse, and the second time point or the third time point is a time point when the controller sends an additional reset pulse or a time point when the controller stops a toggling behavior on a plurality of gate clock signals output to the gate driver, the additional reset pulse and the reset pulse are in a same frame period and the additional reset pulse is later than the reset pulse, and the second time point and the third time point take place after the high refresh rate display area finishes displaying.

27. The display apparatus according to claim 22, wherein the display panel is a liquid crystal display panel, by controlling a time point of an additional reset pulse or a time point when a gate clock signal stops toggling, the controller changes the boundary between the high refresh rate display area and the low refresh rate display area during the partial refresh frame period.

28. The display apparatus according to claim 27, wherein polarity inversion of a whole frame is completed once in the two full refresh frame periods.

29. The display apparatus according to claim 27, wherein the full-partial refresh cycle comprises two full-partial refresh periods, each of the full-partial refresh periods comprises N full refresh frame periods and subsequent M partial refresh frame periods, wherein N>=1 and M>=1, when the number of the boundary between the high refresh rate display area and the low refresh rate display area is not greater than the number (M) of the partial refresh frame periods in the full-partial refresh period, the controller controls the gate driver so that a boundary change sequence in each of the full-partial refresh periods is the same.

30. The display apparatus according to claim 27, wherein the plurality of frame periods comprise a plurality of full-partial refresh periods, each of the full-partial refresh periods comprises N full refresh frame periods and subsequent M partial refresh frame periods, wherein N>=1 and M>=1, when the number of the boundary between the high refresh rate display area and the low refresh rate display area is greater than the number (M) of the partial refresh frame periods in the full-partial refresh period, the controller controls the gate driver so that a boundary change sequence in a first full-partial refresh cycle is different from a boundary change sequence in a second full-partial refresh cycle, wherein each of the first full-partial refresh cycle and the second full-partial refresh cycle comprises at least one full-partial refresh period.

31. The display apparatus according to claim 27, wherein when the display driving chip changes the positive and negative polarities of the data voltage that is output every two frame periods, the controller controls the gate driver, so that the boundary between the high refresh rate display area and the low refresh rate display area changes positions freely.

* * * * *